(12) United States Patent
Martinelli et al.

(10) Patent No.: US 7,528,360 B2
(45) Date of Patent: May 5, 2009

(54) METHOD AND DEVICE FOR STABILIZING THE STATE OF POLARIZATION OF OPTICAL RADIATION

(75) Inventors: Mario Martinelli, San Donato Milanese (IT); Paolo Martelli, Milan (IT); Silvia Maria Pietralunga, Cassina de' Pecchi (IT); Aldo Righetti, Milan (IT)

(73) Assignee: PGT Photonics S.p.A., Milan (IT)

( * ) Notice: Subject to any disclaimer, the term of this patent is extended or adjusted under 35 U.S.C. 154(b) by 0 days.

(21) Appl. No.: 11/661,416

(22) PCT Filed: Sep. 6, 2005

(86) PCT No.: PCT/EP2005/009549

§ 371 (c)(1),
(2), (4) Date: Feb. 28, 2007

(87) PCT Pub. No.: WO2006/027205

PCT Pub. Date: Mar. 16, 2006

(65) Prior Publication Data

US 2007/0253053 A1    Nov. 1, 2007

(30) Foreign Application Priority Data

Sep. 6, 2004    (WO) ................ PCT/EP2004/009917

(51) Int. Cl.
  *G02F 1/01*    (2006.01)
  *G02F 1/07*    (2006.01)
  *G02F 1/00*    (2006.01)
(52) U.S. Cl. .................. 250/225; 359/264; 359/322
(58) Field of Classification Search ........... 250/225, 250/206, 559.09; 359/246, 321, 322, 501
See application file for complete search history.

(56) References Cited

U.S. PATENT DOCUMENTS 6,823,142 B1    11/2004    Tanaka et al.

(Continued)

FOREIGN PATENT DOCUMENTS

EP    1 530 309 A1    5/2005

(Continued)

OTHER PUBLICATIONS

Prat et al.; "Experimental Demonstration of an all-Fiber Endless Polarization Controller Based on Faraday Rotation"; IEEE Photonics Technology Letters, vol. 7, No. 12, pp. 1430-1432, (1995).

(Continued)

*Primary Examiner*—Georgia Y Epps
*Assistant Examiner*—Don Williams
(74) *Attorney, Agent, or Firm*—Finnegan, Henderson, Farabow, Garrett & Dunner, L.L.P.

(57) ABSTRACT

A polarization stabilizing device and method based on controlling the phase retardations of a pair of variable rotators with an optically interposed quarter-wave plate, with a controller such that the first of the variable rotators has its phase retardation switched between first and second values whenever the phase retardation of the second of the variable rotators reaches an upper or a lower limit. The upper and lower limits of the second rotator and the first and second values of the first rotator are chosen so that discontinuities in the power of the output optical radiation are avoided when the first variable rotator is switched, thereby providing endless polarization stabilization using rotators that themselves may have limited retardation ranges.

21 Claims, 13 Drawing Sheets

U.S. PATENT DOCUMENTS

2002/0163707 A1    11/2002    Chen et al.
2003/0122063 A1    7/2003    Biyikli
2003/0175033 A1*    9/2003    Taga et al. .................. 398/152

FOREIGN PATENT DOCUMENTS

FR           2 795 184       12/2000
WO      WO-03/014811 A1      2/2003
WO      WO-2004/013992 A1      2/2004

OTHER PUBLICATIONS

Hinz et al.; "Optical NRZ 2×10 GBIT/S Polarisation Division Multiplex Transmission With Endless Polarisation Control Driven by Correlation Signals"; Electronics Letters, vol. 36, No. 16, pp. 1402-1403, (2000).

Ikeda et al.; "Endless Tracking Polarization Controller"; Furukawa Review, No. 23, pp. 32-38, (2003).

* cited by examiner

METHOD AND DEVICE FOR STABILIZING THE STATE OF POLARIZATION OF OPTICAL RADIATION

CROSS REFERENCE TO RELATED APPLICATION

This application is a national phase application based on PCT/EP2005/009549, filed Sep. 6, 2005, and claims the priority under 37 CFR 1.365(b) of PCT/EP2004/009917, filed Sep. 6, 2004, the content of both of which is incorporated herein by reference.

BACKGROUND OF THE INVENTION

1. Field of the Invention

The invention relates to polarization stabilization, more especially to devices and methods for stabilizing with a high accuracy the polarization state of an optical radiation of arbitrary, possibly time variant, polarization.

2. Description of the Related Art

A polarization stabilizer is a device that transforms an input optical beam having an arbitrary input state of polarization (SOP) into an output optical beam with a predetermined SOP and with an optical power, both not dependent on the input SOP. In general, a defined SOP is determined by two parameters: the ellipticity and the polarization azimuth. Such a device is useful, for example, in coherent optical receivers for matching the SOP between the signal and the local oscillator, in fiber optic interferometric sensors, in compensation of polarization mode dispersion of the transmission line and in optical systems with polarization sensitive components. A fundamental requirement is the endlessness in control, meaning that the stabilizer must compensate in a continuous way for the variations of input SOP.

Several polarization control schemes based on finite range components have been presented. In such schemes, in order to achieve an endless control, it is necessary to provide a reset procedure when a component reaches its range limit so that the output SOP does not change during the reset. Generally, reset procedures can be problematic in that they are often associated with complex control algorithms designed to avoid loss of feedback control during the reset.

In polarization division multiplexing (PolDM) transmission at least two channels are launched orthogonally polarized in the optical transmission medium, such as for example an optical transmission fiber. In a typical solution for PolDM transmission, the at least two channels orthogonally polarized are closely spaced, such as for example within 50 GHz spacing or within 25 GHz spacing. In a preferred configuration, the two channels have substantially the same optical wavelength. Typically, while the reciprocal orthogonality of polarization is substantially preserved along the propagation into the transmitting medium, the SOPs of the two channels randomly fluctuate at a given position along the line, such as for example at the receiver section.

In PolDM, a problem arises at the receiving section, or whenever the two orthogonally polarized channels have to be polarization demultiplexed. In general, the polarization demultiplexer is typically a polarization beam splitter, which is apt to split two orthogonal SOPs. In such an application, exact polarization stabilization of the SOPs of the two channels is strongly desired, in order to facilitate polarization demultiplexing. In case of an error in polarization locking, a misalignment occurs between the SOPs of the two channels and those of the demultiplexer. In this case a cross-talk is generated due to an interference between a channel and the small portion of the other non-extinguished channel, which severely degrades the quality of the received signal. For example, in PolDM systems having the individual channels intensity modulated with non-return-to-zero format and directly detected (IM-DD), the penalty to the bit-error-rate becomes about 1 dB for cross-talk of about 20 dB. This means that in case the intensity of the non-extinguished channel is greater than or equal to about 1% of the intensity of the demultiplexed channel, the cross-talk becomes a concern.

Accordingly, in PolDM systems a highly accurate polarization stabilization is needed before polarization demultiplexing. In fact, the cross-talk after polarization demultiplexing is related to the accuracy of polarization stabilization. The accuracy of a polarization stabilizer in terms of optical power may be expressed through a parameter, called uniformity error, defined according to $$U = \frac{I_{max} - I_{min}}{I_{max} + I_{min}}, \qquad (1)$$

wherein $I_{max}$ and $I_{min}$ are the actual maximum and minimum optical intensities, in locked operation, of the polarization-stabilized output radiation when varying the input SOP. In general, the smaller is the uniformity error, the smaller results the cross-talk after demultiplexing. For example, under simplified conditions, a uniformity error of about 1% gives rise to a cross-talk of about 2%.

The article 'Experimental demonstration of an all-fiber endless polarization controller based on Faraday rotation' of J. Prat et al., IEEE Photonics Technology Letters 7 (1995) December, No. 12, p. 1430-1432, discloses an all-fiber polarization controller based on the Faraday effect. It consists (FIG. 1 in the article) of a first quarter-wave plate, a first fiber-based Faraday rotator, a second fiber quarter-wave plate and a second fiber-based Faraday rotator.

The Applicant notes that the problem faced by the cited article is transforming a linearly polarized incident light from the local oscillator to a continuously and randomly varying SOP, so as to match that of the received SOP (Section III, first sentence thereof). The proposed scheme and control program accept an uncontrolled fluctuation of the output power at reset with a power reduction up to 50%, which is an unacceptable level of power fluctuation for current applications. The cited article does not address the problem of transforming an input optical beam having an input SOP into an output optical beam with a predetermined SOP and with an optical power, both not dependent on the input SOP.

US patent application 2002/163707 discloses an optical filter wherein an optical input is split into polarization components along separate paths. The polarization components are then fed into an electro-optic device that includes a set of electrodes across which a voltage is applied to adjust a wavelength transmission characteristic of the device.

U.S. Pat. No. 6,823,142 discloses an apparatus comprising an optical divider, first and second dispersion compensators, a switch and a switch controller. The first and second dispersion compensators have, respectively, a first and second polarization converter for converting a polarization of one output light from the optical divider into a linear polarization. Each of the first and second polarization converters comprises a first converter using Faraday rotation, a wave plate, and a second converter for moving the polarization of the output light of the wave plate along the equator of the Poincaré sphere. According to the cited patent, when the switch controller is informed that the driving current of one of the polarization transformer exceeds the limit value, it actuates the switch and set the other polarization transformer to operate in the follow-up priority mode and the first polarization transformer to operate in the restriction priority mode after initializing it (e.g. resetting to zero the driving current to be output).

The Applicant notes that the structure and/or the control algorithm of the apparatus of the cited patent are cumbersome, complex and redundant.

The article 'Endless tracking polarization controller' of Kazuhiro Ikeda et al., Furukawa Review April 2003, No. 23, p. 32-38, discloses an endless tracking polarization controller using variable Faraday rotators. It discloses a five-stages (FIG. 5 in the document) or six-stages (FIG. 7 in the document) polarization controller wherein each stage is either a variable Faraday rotator or a variable linear phase shifter (i.e. a linearly birefringent element) obtained by the arrangement of a variable Faraday rotator sandwiched between two quarter wave plates orthogonally oriented. The proposed scheme is complex and the described control algorithm, which includes a reset procedure, is cumbersome and complicate.

U.S. patent application 2003/0122063 discloses a polarization transformer operable to reorient polarization components of an incident optical signal. The polarization transformer includes a continuously adjustable retarder and a limited-range adjustable retarder. The cited patent discloses implementation of continuously adjustable retarder by way of conventional waveplates, lithium niobate devices, semiconductor devices and liquid crystal devices such as vertically-aligned nematic liquid crystal cells using variable lateral electric fields. Different technologies are disclosed to construct limited-range adjustable retarder including: liquid crystal cells, lithium niobate crystals, PLZT materials and mechanically or thermally stressed fiber. The Applicant notes that the cited patent application only discloses variable birefringent elements which are based on the electro-optic or elasto-optic effect, having the disadvantages described further below. Also, the use of a continuously adjustable retarder poses severe limitations on the choice of a variable retarder suitable for this purpose. In addition, the Applicant believes that, even thought the control algorithm is not described in details, the proposed scheme does not allow a simple control algorithm.

WO03/014811 patent discloses an endless polarization stabilizer based on one or two pairs of birefringent components that each have fixed eigenaxes and variable phase retardation, as well as an endless polarization stabilizing method based on a simple feedback control algorithm. A single-stage configuration based on two linearly birefringent variable retarders with finite birefringence range and respective eigenaxes oriented at approximately ±45 degrees relative to each other is described. The endlessness is obtained by commuting the phase retardation of one retarder, when the retardation of the other retarder reaches a range limit. It is also described a single-stage configuration based on a variable linear retarder and a variable polarization rotator.

Furthermore, in WO03/014811 patent application a two-stage configuration has been presented wherein the two stages are controlled independently by respective algorithms that are similar to that used for the single stage configuration. Each stage comprises two variable retarders with finite birefringence range and respective eigenaxes oriented at approximately ±45 degrees relative to each other.

The Applicant has found that none of the known solutions for polarization stabilization is at the same time accurate enough to meet current applications' specifications, especially in the context of PolDM transmission, and simple enough to be practically feasible and operable.

The Applicant has noted that by employing variable birefringent elements which are based on the electro-optic or elasto-optic effect, such as the variable linear retarder of patent application WO03/014811, the resulting polarization stabilizer exhibits an accuracy of polarization tracking which is highly sensitive to possible errors of orientation of the variable birefringent elements. In real word, and especially in a context of industrial production of the stabilizer, the unavoidable errors in the orientation of the variable elements are sufficient to jeopardize the functionality of the device.

In particular, in a variable birefringent plate having fixed eigenaxes, based on the electro-optic or elasto-optic effect, the direction of the variable electrical field or, respectively, the variable strain field and the direction of propagation of the optical beam must be suitably oriented with respect to the internal structure of the plate. An error in this orientation causes a rotation of the birefringence axes in correspondence to the variation of the field intensity. This in turn critically degrades the performances of the polarization stabilizer based on these elements, for example it increases the uniformity error for the optical intensity of the SOP-stabilized output radiation.

SUMMARY OF THE INVENTION

The Applicant has thus faced the problem of providing a simple, fast, feasible and highly accurate method and device to stabilize the polarization of an optical radiation having an input SOP to a predetermined output SOP, while keeping the output optical power not dependent on the input SOP. In particular, the Applicant has sought an accuracy suitable for polarization demultiplexing applications in PolDM systems; for example the uniformity error is preferably less than or equal to 1%.

The Applicant recognizes that in the context of the present invention in order to achieve highly accurate stabilization of the SOP, it is advantageous to first achieve an highly accurate stabilization of one out of the two polarization parameters (ellipticity and azimuth). In other words, an error in the intermediate step of stabilizing one out of the two polarization parameters will propagate in an error in the final result of stabilizing the SOP.

Therefore, the Applicant has faced the more general problem of providing a simple, fast, feasible and highly accurate method and device to stabilize the polarization of an optical radiation having an input SOP to an output SOP having a predetermined ellipticity or azimuth, while keeping the output optical power not dependent on the input SOP. For the purpose of the present invention, the terms "polarization stabilizer" and "polarization stabilization" are more generally referred to as, respectively, an optical device and a method which stabilize at least one out of two polarization parameters (ellipticity and azimuth). In particular, the term "one-parameter polarization stabilization" is used to specify the stabilization of only one of the two polarization parameters, while the term "full polarization stabilization" is used to specify the stabilization of both the parameters (defined SOP).

The Applicant has found that a polarization stabilizer based on a stage comprising two variable rotators and a fixed quarter-wave plate between them, in combination with a simple and effective control algorithm, which avoids reset procedure and is based on the commutation of the first rotator when the second reaches a limit of a retardation range, provides the degree of accuracy, speed and feasibility needed for current applications, for example for polarization demultiplexing in PolDM systems.

According to the invention there is also provided an endless polarization stabilizer based on two of the above described stages independently controlled by a simple feedback control algorithm. This aspect of the invention is particularly useful for polarization demultiplexing in a PolDM system.

In a first aspect, the present invention relates to a polarization stabilizing device for stabilizing the state of polarization of an optical radiation, comprising:

1) a polarization transformer comprising:
   A) a first and a second variable polarization rotator operable to provide respective first and second variable phase retardations to the optical radiation; and
   B) a quarter-wave plate optically interposed between the first and the second variable polarization rotator and having eigenaxes oriented at respectively +45−δ degrees and −45−δ degrees to a defined azimuth, wherein δ is an arbitrary value expressed in degrees;
2) a detecting system apt to generate a monitor signal representative of an optical power of a polarized portion of the optical radiation output from the second variable polarization rotator; and
3) a controller apt to receive said monitor signal from the detecting system and supply first and second control signals, responsive to said monitor signal, respectively to the first and second variable polarization rotators so as to control said first and second variable phase retardations; wherein the controller is configured to set the second control signal so as to maintain the polarization azimuth of the optical radiation output from the second variable polarization rotator at a value of about +45 degrees or −45 degrees to said defined azimuth; and, in case the second variable phase retardation reaches a predefined threshold value equal to about k180+2δ degrees, wherein k is an integer and δ is said arbitrary value expressed in degrees, to set the first control signal so as to switch the first variable phase retardation between first and second values.

Advantageously, the controller is further configured to generate an error value responsive to said monitor signal and related to a displacement of the polarization azimuth of the optical radiation output from the second variable polarization rotator from a value of about +45 degrees or −45 degrees to said defined azimuth, and to set the first and second control signals responsive to the error value.

Preferably, the controller is configured to set the second control signal to stepwise vary the second variable phase retardation in a range of variation of at least 180 degrees, wherein said predefined threshold value is an upper or lower limit of said range of variation.

More preferably, said range of variation spans from k180+2δ degrees to (k+k')180+2δ degrees, wherein k' is an integer different from zero. Still more preferably, k' is equal to 1 or −1.

Advantageously, said first and second values of the first variable phase retardation are spaced apart by an odd integer multiple of 180 degrees. Preferably, said odd integer multiple is equal to 1 or −1.

In one embodiment, the detecting system is further apt to generate a further monitor signal responsive of an optical power of a further polarized portion of the optical radiation and to supply the further monitor signal to the controller.

Advantageously, the polarization transformer consists of said first and second variable polarization rotator and of said quarter-wave plate.

Preferably, the polarization stabilizing device according to the above further comprises a polarizing element apt to polarize the optical radiation output from the second variable polarization rotator to a defined state of polarization having said defined azimuth.

In one embodiment, the polarizing element is a fixed linear polarizer.

In another embodiment, the polarizing element comprises:
1) a further polarization transformer comprising:
   A) a third and a fourth variable polarization rotator operable to provide respective third and fourth variable phase retardations to the optical radiation; and
   B) a further quarter-wave plate optically interposed between the third and the fourth variable polarization rotator and having eigenaxes oriented at respectively +45−δ' degrees and −45−δ' degrees to said defined azimuth, wherein δ' is a further arbitrary value expressed in degrees;
2) a further detecting system apt to generate a polarizing element monitor signal representative of an optical power of a polarized portion of the optical radiation output from the fourth variable polarization rotator; and
3) a further controller connected to receive said polarizing element monitor signal from the further detecting system and to supply third and fourth control signals, responsive to said polarizing element monitor signal, respectively to the third and fourth variable polarization rotators so as to control said third and fourth variable phase retardations; wherein the further controller is configured to set the fourth control signal so as to maintain the state of polarization of the optical radiation output from the fourth variable rotator at said defined state of polarization.

Advantageously, the further controller is configured to set, in case the fourth variable phase retardation reaches a further predefined threshold value, the third control signal so as to switch the third variable phase retardation between third and fourth values equal respectively to about n'180−2δ' degrees and (n'+n")180−2δ' degrees, wherein n' is an integer, n" is an odd integer and δ' is said further arbitrary value expressed in degrees.

More advantageously, said further predefined threshold value is equal to about n180+2δ' degrees, wherein n is an integer.

The value of δ and/or δ' may be equal to about zero degrees.

In a further aspect, the present invention relates to an optical polarization demultiplexer comprising the polarization stabilizing device according to the above, wherein the polarizing element further comprises a polarization beam splitter located, with respect to a direction of propagation of the optical radiation input into the first variable polarization rotator, downstream the fourth variable polarization rotator and having azimuth parallel or perpendicular to said defined azimuth.

In a still further aspect, the present invention relates to a polarization division multiplexing system comprising a polarization multiplexer apt to combine a first and a second optical signal having orthogonal polarization, a transmission line apt to receive said combined first and second optical signal and an optical polarization demultiplexer according to the above, coupled to said transmission line, and apt to separate said first and second optical signal.

In a still further aspect, the present invention relates to a method of stabilizing the state of polarization of an optical radiation, the method comprising:
1) passing sequentially the input optical radiation through:
   a first variable polarization rotator giving a first controllable phase retardation; a quarter-wave plate having eigenaxes oriented at respectively +45−δ degrees and −45−δ degrees to a defined azimuth, wherein δ is an arbitrary value expressed in degrees; and a second variable polarization rotator giving a second controllable phase retardation;

2) extracting a polarized portion of the optical radiation output from the second variable polarization rotator;

3) controlling, responsive to the optical power of said polarized portion, the second controllable phase retardation so that the optical radiation output from the second variable polarization rotator has a polarization azimuth which is about +45 degrees or −45 degrees to said defined azimuth; and 4) in case the second controllable phase retardation reaches a predefined threshold value equal to about k180+2δ degrees, wherein k is an integer and δ is said arbitrary value expressed in degrees, switching the first controllable phase retardation between first and second values.

Preferably, said first and second values of the first variable phase retardation are spaced apart by an odd integer multiple of 180 degrees.

Advantageously, the method above further comprises:

1) passing sequentially the optical radiation output from the second variable polarization rotator through:
a third variable polarization rotator giving a third controllable phase retardation; a further quarter-wave plate having eigenaxes oriented at respectively +45−δ' degrees and −45−δ' degrees to said defined azimuth, wherein δ' is a further arbitrary value expressed in degrees; and a fourth variable polarization rotator giving a fourth controllable phase retardation;

2) extracting a further polarized portion of the optical radiation output from the fourth variable polarization rotator;

3) controlling, responsive to the optical power of said further polarized portion, the fourth controllable phase retardation so that the optical radiation output from the fourth variable polarization rotator has said defined azimuth and a defined ellipticity; and 4) in case the fourth controllable phase retardation reaches a further predefined threshold value, switching the third controllable phase retardation between third and fourth values.

Preferably, said third and fourth values of the third variable phase retardation are equal respectively to about n'180−2δ' degrees and (n'+n")180−2δ' degrees, wherein n' is an integer, n" is an odd integer and δ' is said further arbitrary value expressed in degrees.

BRIEF DESCRIPTION OF THE DRAWINGS

For a better understanding of the invention and its advantages and to show how the same may be carried into effect reference is now made by way of example to the accompanying drawings.

DETAILED DESCRIPTION OF THE INVENTION

Figure 1A:
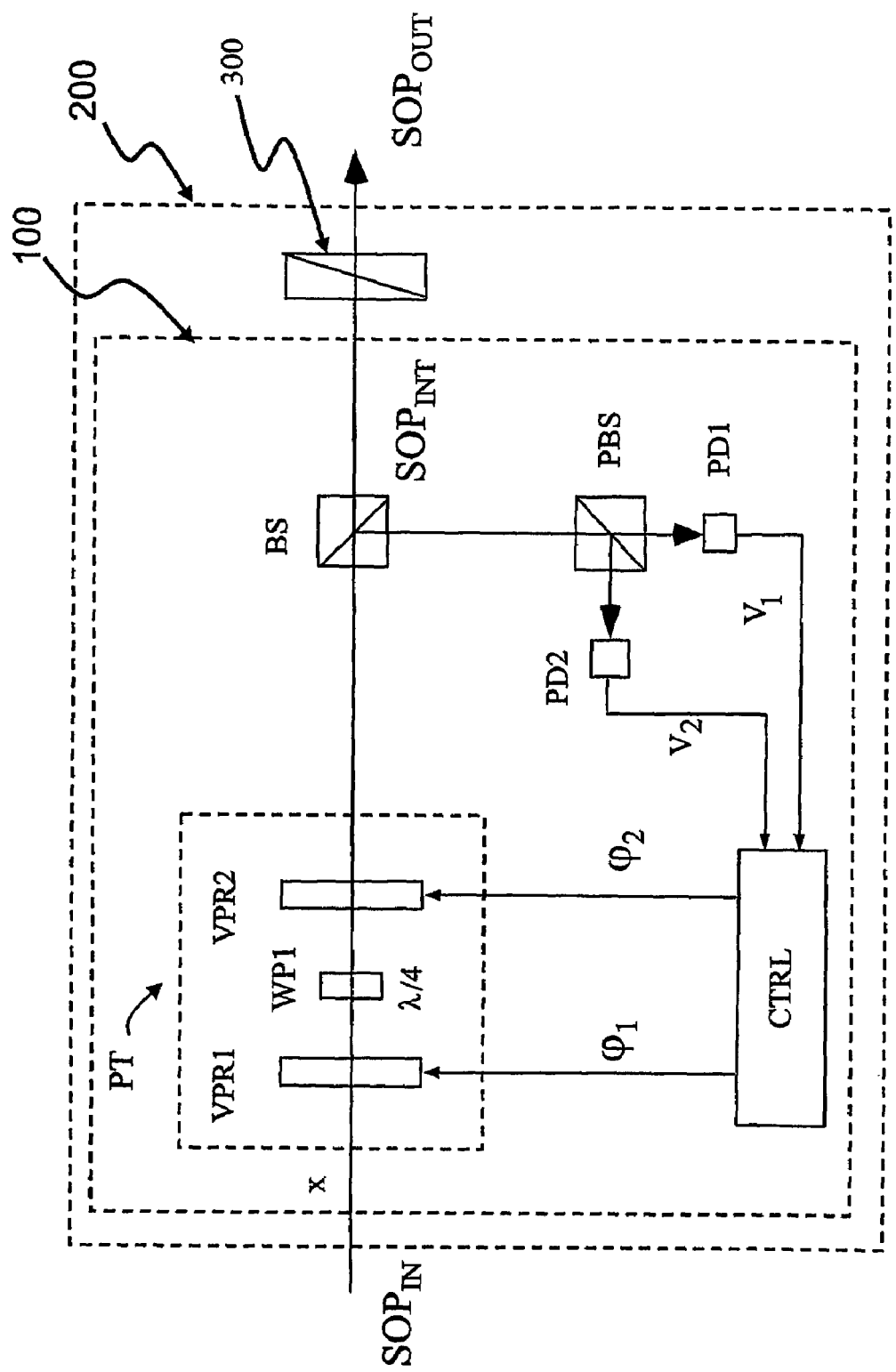
FIG. 1a. Schematic drawing of an endless polarization stabilizer according to the present invention.

FIG. 1a shows an exemplary one-parameter polarization stabilizer device 100 according to the present invention. The device 100 has a principal beam path x along which an optical beam is received as an input optical beam of arbitrary state of polarization (labeled $SOP_{IN}$ in the figure). The optical beam, while propagating along the principal beam path x, traverses a number of optical components (e.g. VPR1, WP1, VPR2, BS) of the device 100 and is emitted from the device 100 as an optical beam having a SOP characterized by at least one out of the two polarization parameters stabilized (i.e. at a defined value). For example, the transmitted SOP (labeled $SOP_{INT}$ in the figure) may be characterized by a polarization azimuth which is oriented at about ±45 degrees (i.e. either +45° or −45°) with respect to a defined azimuth. Without loss of generality, the defined azimuth may be the vertical azimuth. Conventionally, the polarization azimuth will range from −90° to +90°.

The term 'defined azimuth' means a predetermined azimuth. The defined azimuth may be fixed or variable, in a predetermined way, with respect to the reference frame.

Figure 4:
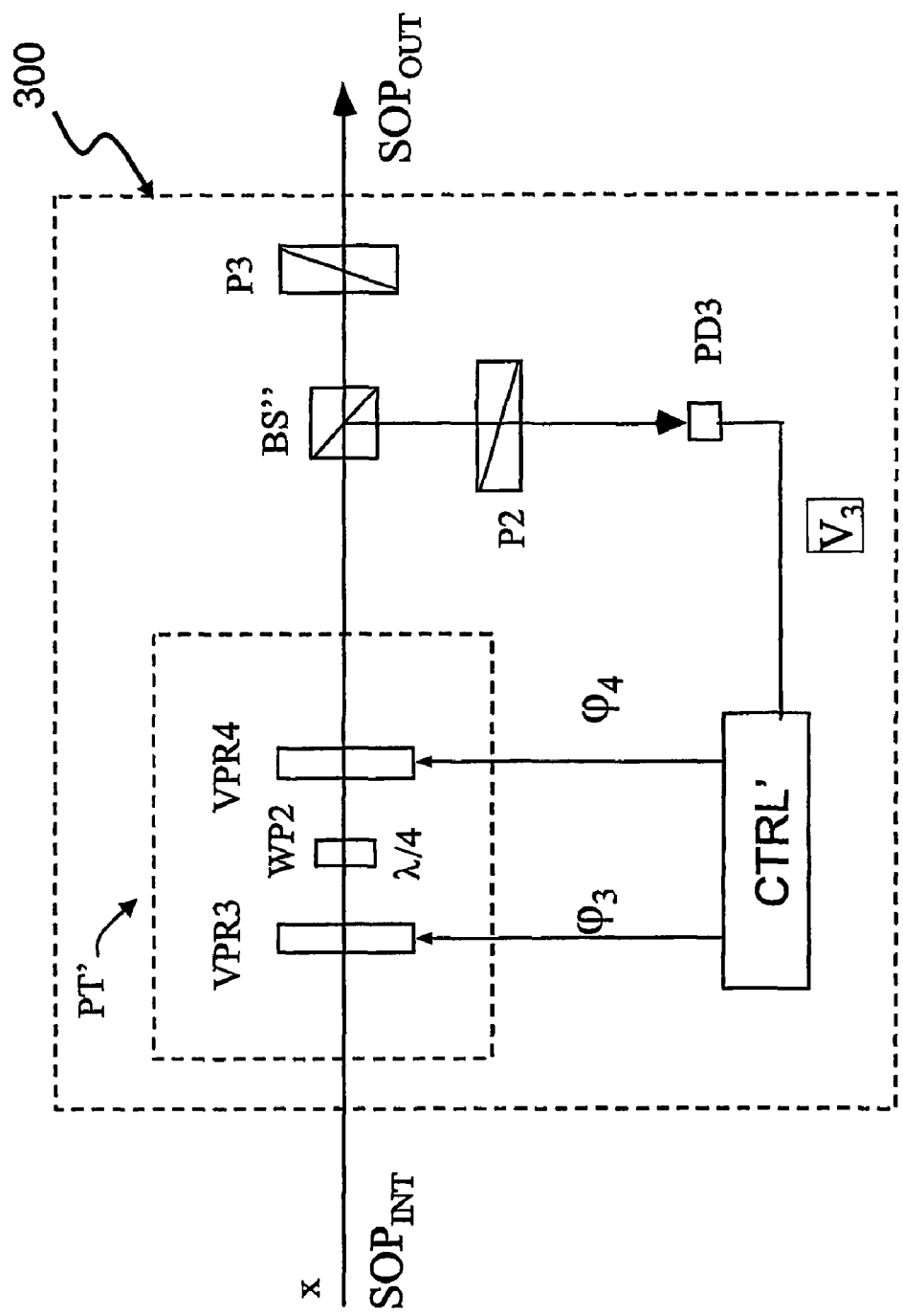

The term 'defined azimuth', as well as any reference to axis orientation in the present description and claims, implicitly assumes a reference frame which is solidly associated to the optical elements VPR1, WP1 and VPR2 of the device 100 or, as appropriate, to the optical elements VPR3, WP2 and VPR4 of the device 300 of FIG. 4. Typically those elements are fixed with respect to the laboratory.

The device 100 comprises a polarization transformer PT comprising first and second variable rotators VPR1 and VPR2 which are variable circularly birefringent elements with controllable phase retardations $\Phi_1$ and $\Phi_2$, respectively. The variable rotators VPR1 and VPR2 are placed along the beam path x. For the purpose of the present description and claims, the term 'rotator', or equivalently 'polarization rotator', refers to a birefringent element with circular eigenstates, i.e. a birefringent element that rotates the azimuth of the SOP while maintaining the ellipticity of the SOP constant. A circularly birefringent element giving a phase retardation $\Phi$ between the circular eigenstates causes a rotation of an angle $\Phi/2$ of the polarization azimuth.

The first variable rotator VPR1 has an associated controllable phase retardation $\Phi_1$ which may have, and typically has, a limited range. Advantageously, the limited range is at least 90 degrees wide. The second variable rotator VPR2 has an associated controllable phase retardation $\Phi_2$ which may have, and typically has, a limited range. Advantageously, the limited range is at least 180 degrees wide.

In a preferred configuration, the variable rotators VPR1 and VPR2 are variable Faraday rotators, i.e. variable polarization rotators which make use of the magneto-optical Faraday effect and wherein the magnetic field applied to a magneto-optical material is varied. For example, the variable Faraday rotators VPR1 and VPR2 may be based on the principle described in the patent U.S. Pat. No. 5,844,710.

The polarization transformer PT also comprises a quarter-wave plate WP1 placed along the beam path x and optically interposed between the first and second variable rotators VPR1 and VPR2. The Applicant has surprisingly found that the orientation of the eigenaxes of the quarter-wave plate WP1 may be arbitrary, as described in details below. In other words, the eigenaxes of the quarter-wave plate WP1 are oriented respectively at +45−δ degrees and −45−δ degrees with respect to the defined azimuth, wherein δ is an arbitrary value expressed in degrees. It may be assumed that δ ranges from −90 degrees to +90 degrees, limits included.

The quarter-wave plate WP1, as well any other component in the present invention, may be replaced by a technical equivalent, such as a combination of birefringent elements performing the same function, without exiting from the scope of the present invention. In a preferred configuration, the polarization transformer PT consists, for what concerns the optical birefringent elements, only of the first and second variable rotators VPR1 and VPR2 and the quarter-wave plate WP1 optically interposed therebetween. Such a polarization transformer PT is advantageous due to its simplicity and consequently low insertion loss, high feasibility and high accuracy.

A polarization insensitive beam-splitter BS may be arranged in the beam path x to extract a small fraction of the optical radiation output from the second variable rotator VPR2. For minimum losses, the extracted portion of the radiation should be vanishingly small. However, in practice, the diverted portion needs to be large enough to provide a reasonable signal-to-noise ratio for subsequent processing associated with the control loop. A diverted power fraction of between 1-10% may be typical. For example, a beam splitter BS with a 90/10 splitting ratio may be used. It will be appreciated that other optical components can provide the same function of extracting a small fraction of the beam, for example an optical fiber coupler.

A polarizing beam splitter PBS may be optically connected to the beam splitter BS and is apt to receive the optical radiation extracted by the beam splitter BS. The azimuth of the PBS is approximately parallel or perpendicular to the defined azimuth. In other words, the PBS is apt to separate a (linearly) polarized portion of the extracted optical beam having an azimuth parallel to the defined azimuth from a (linearly) polarized portion of the optical radiation having an azimuth orthogonal to the defined azimuth. Throughout the present description, the term "polarized portion" or "polarized component" means the projected component of the optical beam along a given SOP. For sake of clarity, in case of deviation of the optical radiation, for example a reflection by a beam splitter, the reference system for the state of polarization is accordingly transported. It will be appreciated that any other optical arrangement for performing the same function may be used instead of a polarizing beam splitter PBS. For example a polarization insensitive beam splitter followed by two orthogonally oriented linear polarizers, one for each output component of the polarization insensitive beam splitter is functionally the same as a polarizing beam splitter and they may be interchanged. Optical fiber components can also be used to provide the same function.

A first and a second photodiode PD1 and PD2 may be optically connected to the polarizing beam splitter PBS, one for each output of the PBS. They are apt to detect the two polarized components of the optical radiation output from the PBS and to generate respective signals $V_1$ and $V_2$ responsive of the optical power of the two polarized components of the optical radiation output from the PBS. It will be appreciated that these signals may be in electronic form, with the photodiodes being optoelectronic converters. However, it will also be appreciated that these processing elements could be embodied with all-optical components of the same functionality. This may be desirable for stabilizing extremely high frequency polarization instabilities where all-optical power sensing and control processing could be performed. In addition, the signals $V_1$ and $V_2$ may also be radio signals.

A controller (e.g. electronic) CTRL is connected to the first and second photodiode PD1 and PD2 and is apt to receive the signals $V_1$ and $V_2$. The controller CTRL has first and second outputs connected respectively to the first and second rotators VPR1 and VPR2. The controller CTRL is apt to generate output control signals, responsive to the signals $V_1$ and $V_2$, according to a control algorithm described further below. The output control signals are suitable to be sent to, and to control the phase retardations $\Phi_1$ and $\Phi_2$ of, the rotators VPR1 and VPR2, respectively.

They are labeled $\phi_1$ and $\phi_2$ in FIG. 1a.

In particular applications, for example when the power of the input optical beam is known and can be held constant, either photodiode PD1 or photodiode PD2 may be omitted. In this case, the polarizing beam splitter PBS may be replaced by a fixed linear polarizer oriented either parallel or perpendicular to the defined azimuth.

The function of the one-parameter polarization stabilizer device 100 is to transform any (i.e. an arbitrary) input SOP into an elliptical output SOP ($SOP_{INT}$) with principal axes at ±45 degrees (i.e. +45° and −45°) to said defined azimuth, or, in equivalent words, an arbitrary input SOP into an elliptical output SOP ($SOP_{INT}$) with polarization azimuth at ±45 degrees (i.e. either +45° or −45°) to said defined azimuth. Furthermore the polarization stabilizer device 100 sets the output power to a value that is independent of the input SOP.

In operation, the input optical radiation having arbitrary input SOP traverses sequentially the first variable rotator VPR1, the quarter-wave plate WP1 and the second variable rotator VPR2. The first variable rotator VPR1 and the second variable rotator VPR2 rotate the azimuth of the optical radiation by respectively a first and a second variable angle $\Phi_1/2$ and $\Phi_2/2$, such that, in combination with the fixed action of the quarter-wave plate WP1, the SOP of the optical radiation output from the second variable rotator VPR2 ($SOP_{INT}$) has a polarization azimuth at about ±45 degrees (i.e. +45° or −45°) with respect to the defined azimuth.

A feedback control loop is designed to lock the polarization azimuth of the SOP ($SOP_{INT}$) of the optical radiation output from the second rotator VPR2 to the target azimuth value equal to ±45 degrees with respect to the defined azimuth. In this case, the optical power component transmitted by the PBS in FIG. 1a is equal to the optical power component reflected by the PBS.

The polarization insensitive beam splitter BS diverts a portion of the beam out of the main beam path x. The diverted portion of the beam is then received by the polarizing beam splitter PBS which splits the diverted beam portion into its two orthogonal polarization components, which are supplied to, and detected by, the respective photodiodes PD1 and PD2. The polarizing beam splitter PBS is oriented so that ideally the incident beam is totally reflected or transmitted in correspondence of an azimuth parallel or perpendicular to the defined output azimuth. The photodiodes PD1 and PD2 supply respective signals $V_1$ and $V_2$ as input signals to the controller CTRL.

The controller CTRL executes an algorithm described below and generates the two signals $\phi_1$ and $\phi_2$, responsive of signals $V_1$ and $V_2$, controlling the phase retardations $\Phi_1$ and $\Phi_2$ respectively of VPR1 and VPR2. In particular, the algorithm contains a calculation of an error value which is related to the displacement of the polarization azimuth of the optical radiation output from the second variable rotator VPR2 from a target azimuth value equal to about ±45 degrees with respect to the defined azimuth. The aim of the control loop is to minimize the above error.

For example, the error may be defined as $\epsilon = |V_1 - \alpha V_2|$, where the parameter $\alpha$ is fixed so that the error is ideally zero when the polarized components of $SOP_{INT}$ parallel and perpendicular to the defined azimuth have equal optical power. This condition is equivalent to the target of an elliptical $SOP_{INT}$ with principal axes at ±45 degrees (i.e. +45° and −45°) to said defined azimuth. For example, considering the case of the stabilizer device 100 of FIG. 1a having an ideal PBS and photodiodes PD1 and PD2 having equal responsivities, the value of $\alpha$ may be chosen equal to 1. In general, different devices may have different values for the parameter $\alpha$.

In those applications, described above, wherein either photodiode PD1 or photodiode PD2 may be omitted, there is acquired at each control period of the feedback loop only one signal $V_{out}$ responsive of the optical power of a polarized component of the stabilized optical radiation and the error is defined as $\epsilon = |V_{out} - V_{ref}|$, where $V_{ref}$ is set via the CTRL taking into account the input optical power and the behavior of the optical elements, e.g. their insertion losses.

The feedback control loop will have a characteristic delay time, for example in the microsecond range limited by analogue-to-digital and digital-to-analogue converters that may be present at the input and output of the controller CTRL. Moreover, SOP fluctuations which need to be canceled out in the input optical beam will typically also have a power spectral density with appreciable components from DC to the kHz range. This SOP fluctuation speed may be much slower than the data rate being carried on the optical signal which may be in the GHz range (Gbit/s). For these reasons, the photodiodes PD1 and/or PD2 may advantageously be selected to have a limited bandwidth, for example of 1 MHz, so that provision of separate filters is not required. In general it is preferred that the bandwidth of the photodiodes is matched to the cycle time of the control loop and the minimum stabilization time constant required for the application concerned.

The minimization of the error is achieved by controlling the phase retardations $\Phi_1$ and $\Phi_2$ of the two variable rotators VPR1 and VPR2. The phase retardation $\Phi_2$ applied by the second variable rotator VPR2 is varied in a continuous or quasi-continuous manner, with a discretization that follows from the stepwise incremental nature of the computer-implemented control scheme. It is convenient that the steps of variation of the phase retardation $\Phi_2$ have a constant absolute value $\vartheta$, referred to as the "step angle $\vartheta$", although non-constant step angles, for example dependent on the absolute value of the phase retardation $\Phi_2$, could be used. For example, it may be $\vartheta = 1°$. Clearly, different step angle sizes $\vartheta$ can be chosen, depending on the circumstances, for example the specification of the retarder elements and the desired response of the device.

In general, the smaller the step angle size, the better the stabilization (smaller uniformity error), but a trade-off with the stabilization speed need to be considered. In fact, for a given step angle size $\vartheta$, the maximum SOP fluctuation on the Poincaré sphere in the step time of the control loop that can be compensated for is about $\vartheta/2$.

The phase retardation $\Phi_2$ of VPR2 is stepwise varied by the controller CTRL, through respective control signal $\phi_2$, in a predefined range (also called 'variation range') of at least 180°, within the limited range. Preferably, this predefined range has lower limit and upper limit spaced apart by an integer (different from zero) multiple of 180°. More preferably, the predefined range spans from k180+2δ degrees to (k+k')180+2δ degrees (limits included), wherein k is an integer, k' is an integer different from zero, and δ is the arbitrary value expressed in degrees introduced above with reference to the orientation of the eigenaxes of the quarter-wave plate WP1. It is noted that with reference to the orientation of the eigenaxes of the quarter-wave plate WP1, δ represents a physical angle in degrees, while with reference to the phase retardation $\Phi_2$, it represents a phase expressed in degrees. Preferably, k' is equal to 1 or −1. Exemplarily δ may be equal to zero. In this case the predefined range of variation of the phase retardation of VPR2 may be for example between 0° and 180° or between 180° and 360° or between 360° and 540°. Preferably, k is equal to 0.

Whenever the input SOP varies to cause the phase retardation $\Phi_2$ reach a threshold of the predefined range, i.e. an upper or lower limit of the predefined range equal to k"180+2δ degrees, k" integer, then the retardation $\Phi_1$ of the first variable rotator VPR1 is switched by the controller CTRL, through respective control signal $\phi_1$, between a first and a second value. Said first and second values may be chosen from a plurality of values, selectable for the above switch, within the limited range of the first rotator VPR1. Typically, the phase retardation $\Phi_1$ spans all the intermediate values during the switch between a first and a second value. Preferably, two adjacent values within the plurality of switching values are spaced apart by an odd (different from zero) integer multiple of 180°. Preferably, the phase retardation $\Phi_1$ may be controlled to switch between only two retardation values which differ by an odd (different from zero) integer multiple of 180°. Preferably, this integer multiple is equal to 1 or −1. Preferably, the two retardations value are integer multiples of 180°, i.e. they assume the values of m180 and (m+m')180 degrees, wherein m is an integer and m' is an odd integer different from zero. Preferably m' is equal to 1 or −1. For example, m may be equal to 0, ±1 or ±2. Preferably, the two retardations value are equal to 0° and 180°. Exemplarily the first and second values of the first phase retardation may be chosen equal respectively to the upper and lower limit of the range of variation of the second phase retardation.

At the same time of the switch of the first variable rotator VPR1, the sign of the phase retardation increments on the second variable retarder is reversed. In the normal mode of operation, when the retardation of VPR2 is not at threshold limit, then the retardation of VPR1 is kept constant at, e.g., 0 or 180 degrees.

The switching of the phase retardation of VPR1 when the second variable phase retardation ($\Phi_2$) reaches a predefined threshold value equal to about k180+2δ degrees, together with the orientation of the eigenaxes of the quarter-wave plate WP1 at about ±45−δ degrees to the defined azimuth, allows to overcome the finite birefringence range wherein VPR2 is operated (i.e. the predefined variation range) and to obtain an endless polarization stabilization, while avoiding any cumbersome reset procedure. As will be explained below, the above combination of VPR1, WP1 and VPR2 and their operation by the controller CTRL described above, are so that the azimuth value of the output SOP ($SOP_{INT}$) is not appreciably perturbed (i.e. it remains endlessly locked on the desired value) during the switching of rotator VPR1, provided that the input SOP variation is sufficiently small in the switching time.

The control algorithm is a simple cyclic control algorithm that can be implemented on a digital PC-based controller (CTRL), or any other suitable hardware, firmware, software or combination thereof. An all-optical processor could also be used for the controller.

At each control period or step the signal control $\phi_2$ of VPR2 may be changed so that the respective phase retardation $\Phi_2$ changes by a quantity of constant step angle $\vartheta$. At each step the control algorithm calculates the error: if the error at the current step becomes larger than the error at the previous step, then the sign of the retardation variation is changed, else the sign is not changed. The signal control $\Phi_1$ of the phase retardation of VPR1 is kept constant as long as $\Phi_2$ is not a limit of the predefined range, e.g. [0°, 180°]. If the value $\Phi_2$ has reached a range limit and the sign of the retardation variation would lead next step $\Phi_2$ outside of the range, then the value of $\Phi_2$ is not changed at the successive step, whilst the variation sign is inverted and the value of $\Phi_1$ is commuted between 0° and 180°.

More precisely the control algorithm consists of the following algorithm steps:
1. assignment of the constant $\alpha$, depending on the behavior of the optical components;
2. initialization to zero of the error at the previous step $\epsilon_0$;
3. initialization of the Boolean value S that can assume only the values 0 or 1, corresponding to the commutation state of the first rotator VPR1;
4. initialization of the second rotator retardation $\Phi_2$ to the middle range value, e.g. 90°;
5. initialization of the variation sign $\sigma$ the phase retardation $\Phi_2$;
6. initialization of the absolute value $\vartheta$ (step angle) of the variation of the phase retardation $\Phi_2$;
7. acquisition of $V_1$ from the first photodiode;
8. (optional in case of $V_{ref}$) acquisition of $V_2$ from the second photodiode;
9. calculation of the current error $\epsilon$ as absolute value of $(V_1 - \alpha V_2)$;
10. if the current error $\epsilon$ is greater than the previous error $\epsilon_0$ then:
    10.1. inversion of the variation sign $\sigma$,
11. variation of $\Phi_2$ by a quantity of absolute value $\vartheta$ and sign $\sigma$;
12. if $\Phi_2$ is not between 0° and 180° then:
    12.1. inversion of the variation sign $\sigma$,
    12.2. variation of $\Phi_2$ by a quantity of absolute value $\vartheta$ and sign $\sigma$,
    12.3. negation of the Boolean state S, that means commutation of the state of the first rotator VPR1;
13. assignment of the current error $\epsilon$ to the previous error $\epsilon_0$;
14. updating of $\Phi_1$ as product between S and 180°;
15. output of the first phase retardation $\Phi_1$;
16. output of the second phase retardation $\Phi_2$;
17. return to algorithm step 7.

FIGS. 2 and 3a-d are now referred to to explain the principles of operation of the proposed polarization stabilizer 100 in terms of a Poincaré sphere representation. For the sake of clarity, the following illustrative description refers to the particular case of the value $\delta$ equal to zero.

Figure 2:
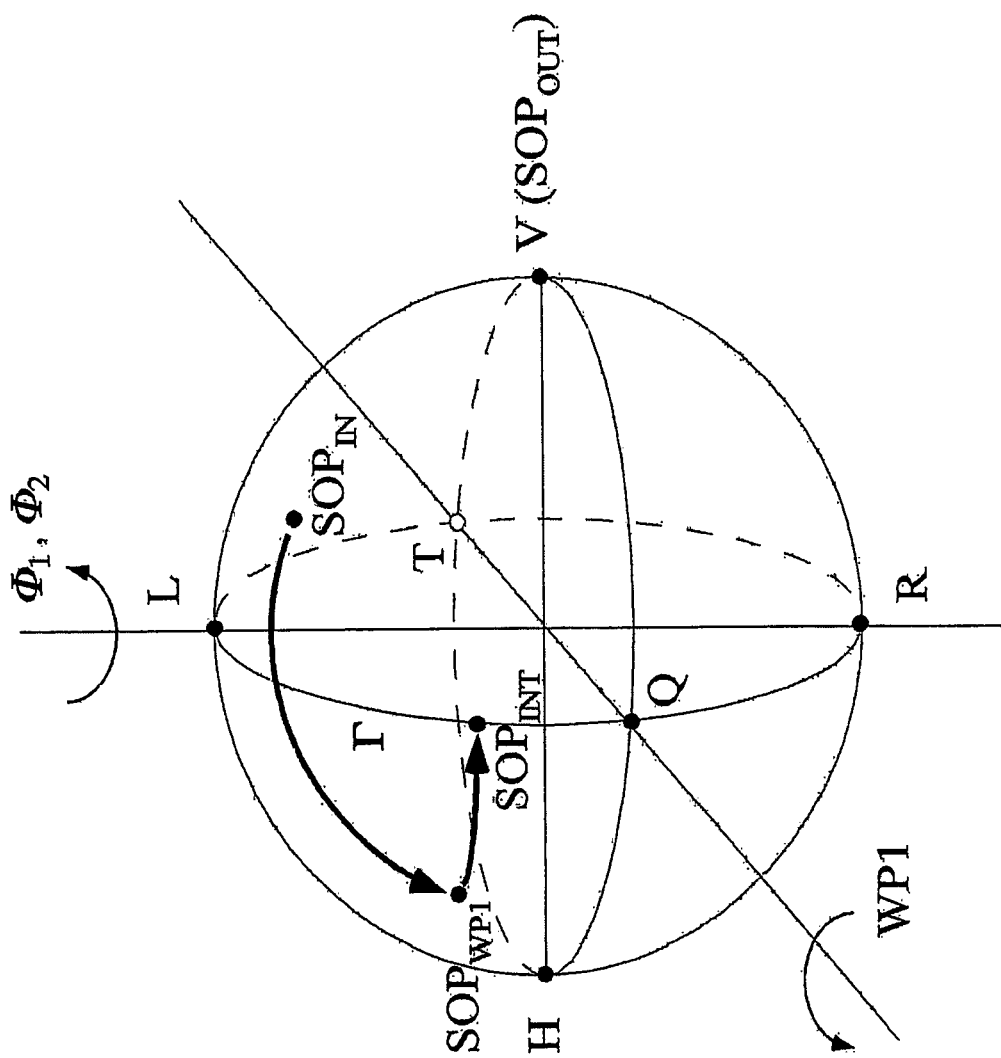
FIG. 2. Poincaré sphere representation of an exemplary polarization stabilizer of the present invention.

Referring now to FIG. 2, each SOP is represented by a point on the sphere, with longitude $2\eta$ and latitude $2\xi$. The angle $\eta$ is the azimuth of the major axis of the polarization ellipse and the quantity tan $\xi$ is the ellipticity with sign plus or minus according to whether the SOP is left-handed or right-handed. The poles L and R correspond to the left ($\xi=45°$) and the right ($\xi=-45°$) circular SOP respectively. The points on the equator represent linearly polarized light with different azimuths $\eta$. In particular the points H and V correspond to the horizontal ($\eta=0°$) and the vertical ($\eta=90°$) linear SOP respectively. The points Q and T correspond to the linear SOP with azimuth $\eta=45°$ and $\eta=-45°$ respectively.

The action of a fixed polarizer is to transmit only the component of light in a fixed SOP. The transmitted fraction of the incident optical power is $\cos^2(\phi/2)$, where $\phi$ is the angle at the center of the sphere between the representative points of incident and transmitted SOP.

For a generic birefringent element there are two orthogonal states of polarization, said eigenstates, which are not changed by the element itself. The effect of the propagation through a birefringent element is represented on the Poincaré sphere by a rotation of an angle $\Phi$ about a suitable axis. The diametrically opposite points corresponding to the orthogonal eigenstates belong to and identify this axis of rotation. The angle of rotation $\Phi$ is equal to the phase retardation or phase difference introduced by the birefringent elements between the eigenstates. In case of linearly birefringent element, that is an element with linearly polarized eigenstates, it is possible to define two orthogonal eigenaxes respectively as the fixed directions of the linearly polarized optical field corresponding to the eigenstates. A rotator is represented as a birefringent element having its axis of rotation on the vertical axis passing through the poles L and R, as shown in FIG. 2 with the top curved arrow near the symbols $\Phi_1$ and $\Phi_2$ representing the rotation on the sphere corresponding to the rotators VPR1 and VPR2, respectively.

In FIG. 2, an arbitrary input SOP ($SOP_{IN}$) is first transformed into $SOP_{WP1}$ by the quarter-wave plate WP1, having its axis of rotation passing through points T and Q and an associated fixed rotation on the sphere of 90°. Then it is transformed by the second rotator VPR2 into a SOP ($SOP_{INT}$) represented on the Poincaré sphere by a point belonging to the great circle $\Gamma$ including the points L and Q, that is an elliptical SOP with major axis oriented at ±45° (i.e. with polarization azimuth equal to about +45° or −45°) with respect to the (vertical) defined azimuth. Thus, by suitably controlling the phase retardation $\Phi_2$ of the second rotator VPR2 in the exemplary range between 0° and 180°, any input SOP ($SOP_{IN}$) is transformed into a SOP belonging to the great circle $\Gamma$. In other words, the polarization stabilizer 100 locks the polarization state on a meridian of the sphere, i.e. it locks the polarization azimuth value modulus 90°. It is contemplated that any great circle on the Poincaré sphere may take the place of the meridian $\Gamma$ in FIG. 2, being the locus of the SOPs having one of the two polarization parameters (or a combination thereof) fixed.

In the proposed polarization stabilizer design, to achieve an endless control, there is provided a further variable rotator (VPR1) that is controlled to commute (i.e. switch) its phase retardation between, exemplarily, 0° and 180° when the phase retardation of the smoothly varied rotator VPR2 reaches a range limit. For the sake of clarity, in FIG. 2 it is assumed that the phase retardation of VPR1 is null.

The endlessness of the present control scheme will now be illustrated. To this purpose, it will be assumed that the representative point of the input SOP moves along the trajectory on the Poincaré sphere shown in FIG. 3a. Four successive representative positions of the input SOP (labeled with incremental numbers from 1 to 4) will be considered.

FIGS. 3b-3e represent the four corresponding SOP evolutions during the propagation of the optical radiation through the polarization stabilizer 100. The points labeled with the subscripts VPR1, WP1 and VPR2 represent respectively the SOP outputted by the switched rotator VPR1, the SOP outputted by the linear plate WP1 and the SOP transmitted by the smoothly varied rotator VPR2.

Initially (FIG. 3b), the point 1 (SOP$_{IN}$) passes unperturbed the switched retarder VPR1 (phase retardation $\Phi_1=0°$). Then it is transformed into the point $1_{WP1}$ by the action of the quarter-wave plate WP1 and subsequently into the point $1_{VPR2}$ (belonging to $\Gamma$) by the action of the smoothly varied retarder VPR2 with exemplary phase retardation $\Phi_2=90°$.

Figure 3A:
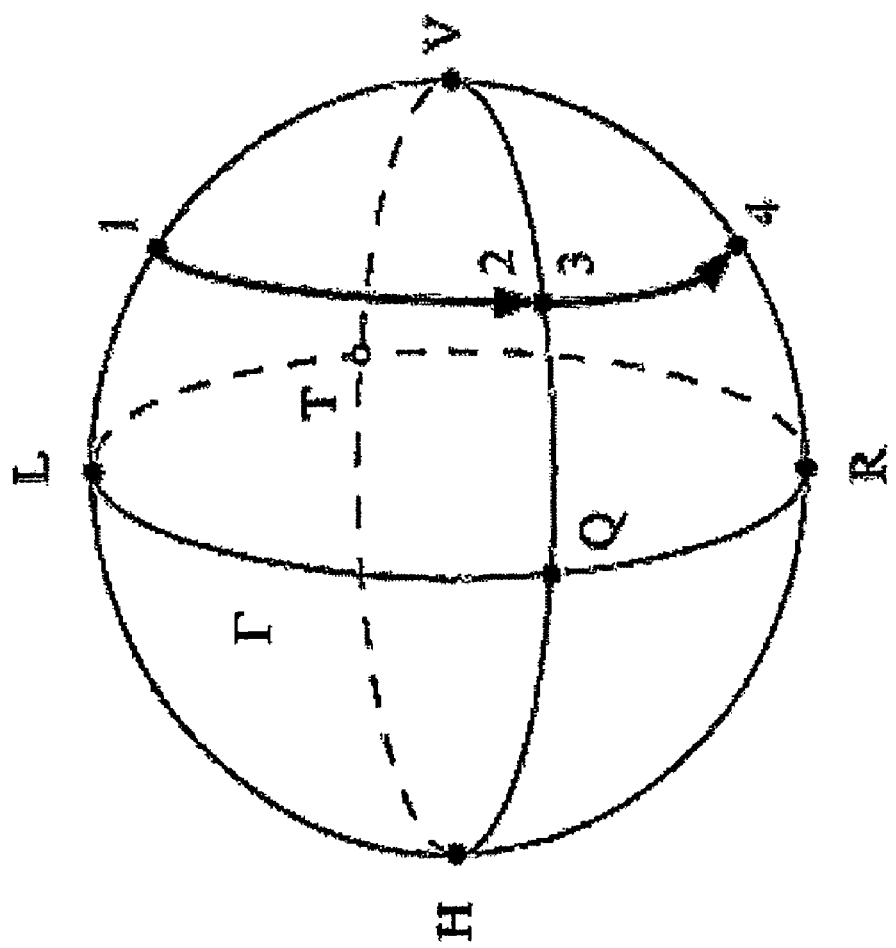
FIG. 3a. Four exemplary points on the Poincaré sphere representing four exemplary input SOPs to an exemplary polarization stabilizer of the present invention.
Figure 3B:
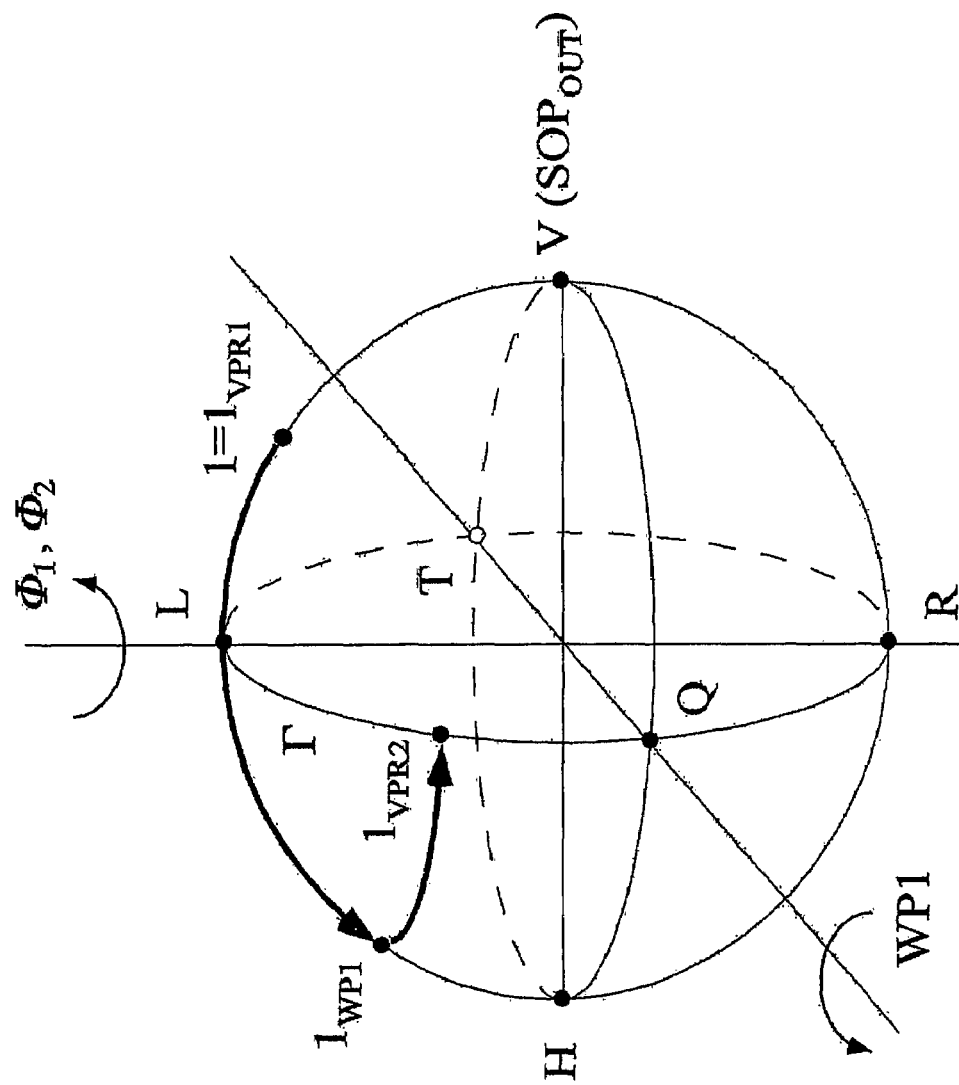
FIGS. 3b-3e. SOP transformations on the Poincaré sphere, generated by an exemplary polarization stabilizer of the present invention, corresponding to the four input SOPs of FIG. 3a FIG. 4. Schematic drawing of a polarizing element advantageously comprised in the present invention polarization stabilizer.
Figure 3C:
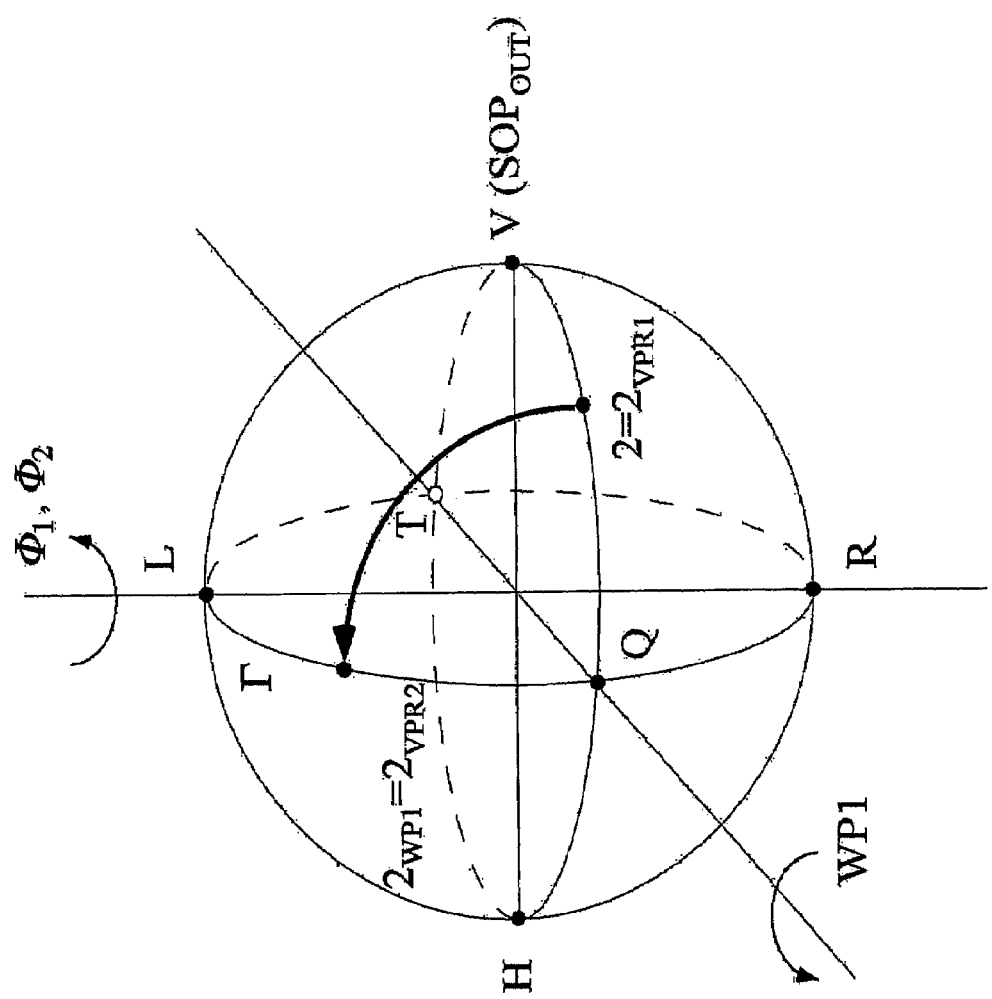

The variation of SOP$_{IN}$ shown in the trajectory from point 1 to point 2 in FIG. 3a, is compensated by progressively decreasing the phase retardation $\Phi_2$ till to zero when the point SOP$_{IN}$ intercepts the great circle including V and Q, i.e. the equator (point 2 in FIG. 3c, $\Phi_1=0°$, $\Phi_2=0°$). In fact, after the action of WP1, the SOP is already on the great circle $\Gamma$.

Figure 3D:
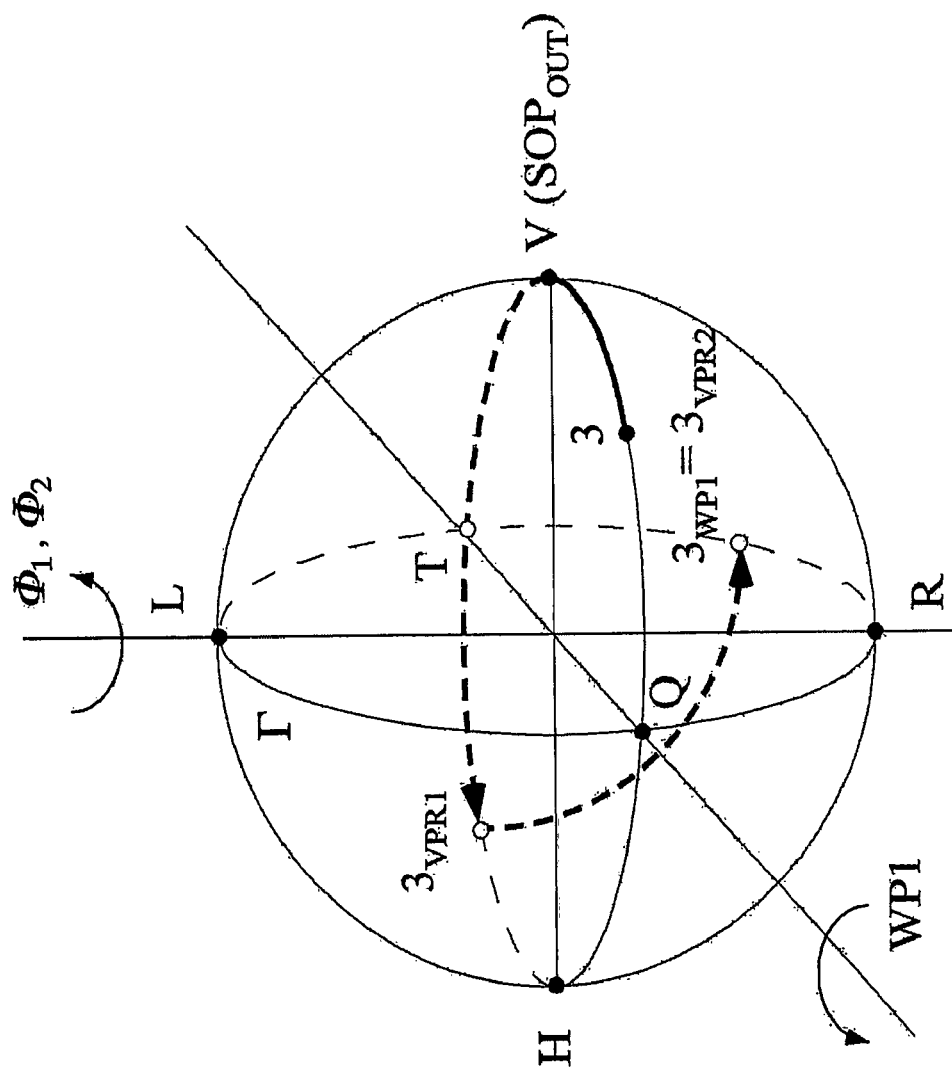
Figure 3E:
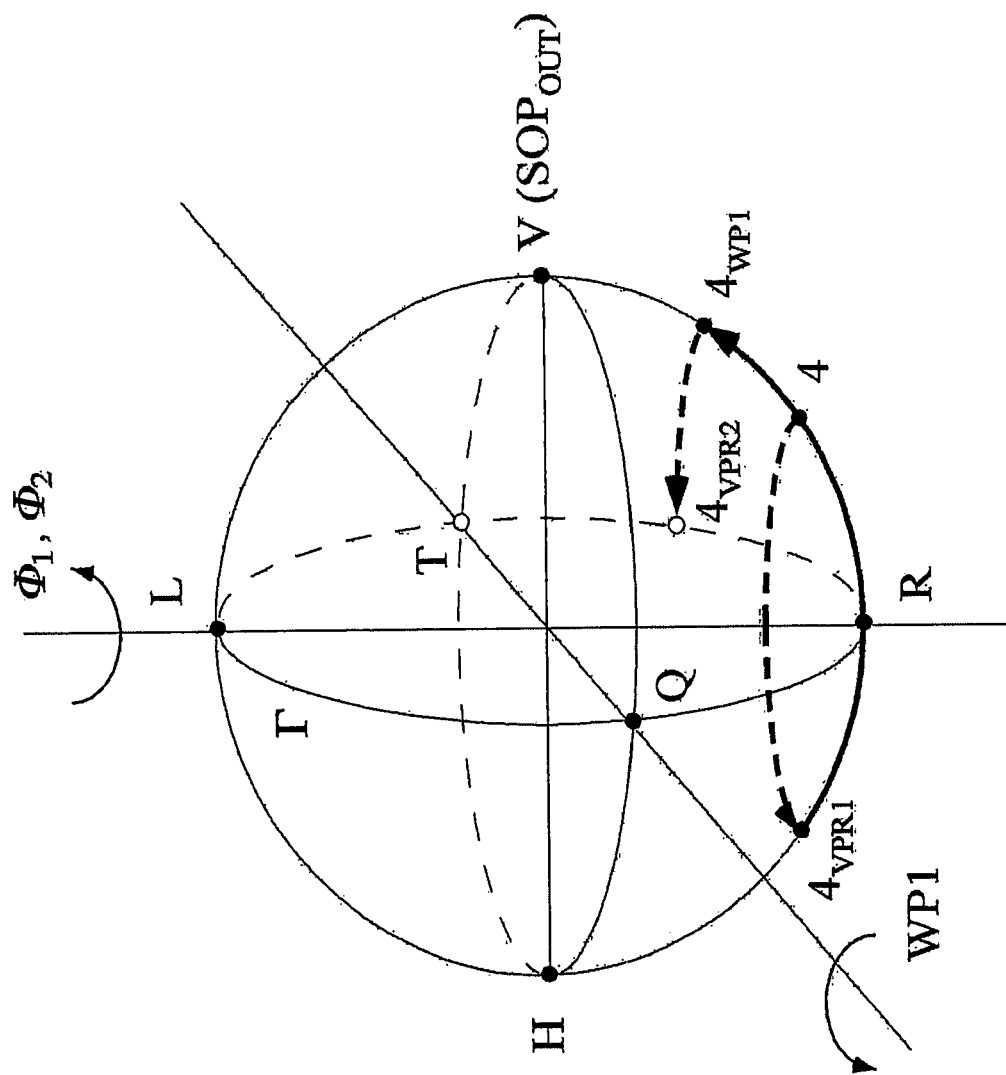

The further variation of SOP$_{IN}$ according to FIG. 3a can not be compensated simply by decreasing $\Phi_2$ because it has reached the lower limit. Therefore, in order to obtain an endless control, the phase retardation $\Phi_1$ is commuted to 180°, while $\Phi_2$ is kept constant (i.e. equal to zero). As illustrated in FIG. 3d, the polarization azimuth of the input SOP (point 3) is rotated of 90° by the first variable rotator VPR1 by means of a rotation of 180° around the vertical axis (i.e. $\Phi_1=180°$, $\Phi_2=0°$). Now the successive variation of SOP$_{IN}$ is compensated by increasing $\Phi_2$ (FIG. 3e, $\Phi_1=180°$, $\Phi_2=90°$).

It is important to note that during the commutation of the first phase retardation $\Phi_1$ the SOP moves always on the equator (trajectory 3-3$_{VPR1}$ in FIG. 3d), which is subsequently transformed into the great circle $\Gamma$ including L and Q by the quarter-wave plate WP1. During commutation, the subsequent rotator VPR2 is either at 0 or 180°, i.e. it transforms the circle $\Gamma$ in itself. In conclusion, during the commutation of VPR1 the SOP transformed by the stabilizer 100 remains at the target polarization azimuth (module 90°), provided that the input SOP is nearly constant during the commutation.

It is noted that, in case the value of $\delta$ is different from zero, the switching condition (second variable phase retardation ($\Phi_2$) reaches a predefined threshold value equal to about k180+2$\delta$ degrees) means that, during the switching of the first rotator, the meridian $\Gamma'$ on the Poincare sphere passing from the poles and the eigestates of the quarter-wave plate WP1 is transformed by the second polarization rotator into the meridian $\Gamma$. During the same switching, the SOP input to the first rotator VPR1 as well as to the quarter-wave plate WP1 is on the equator, thus guaranteeing polarization stabilization (during the switching of the first rotator, the SOP output from the second rotator VPR2 remains on $\Gamma$).

Figure 1B:
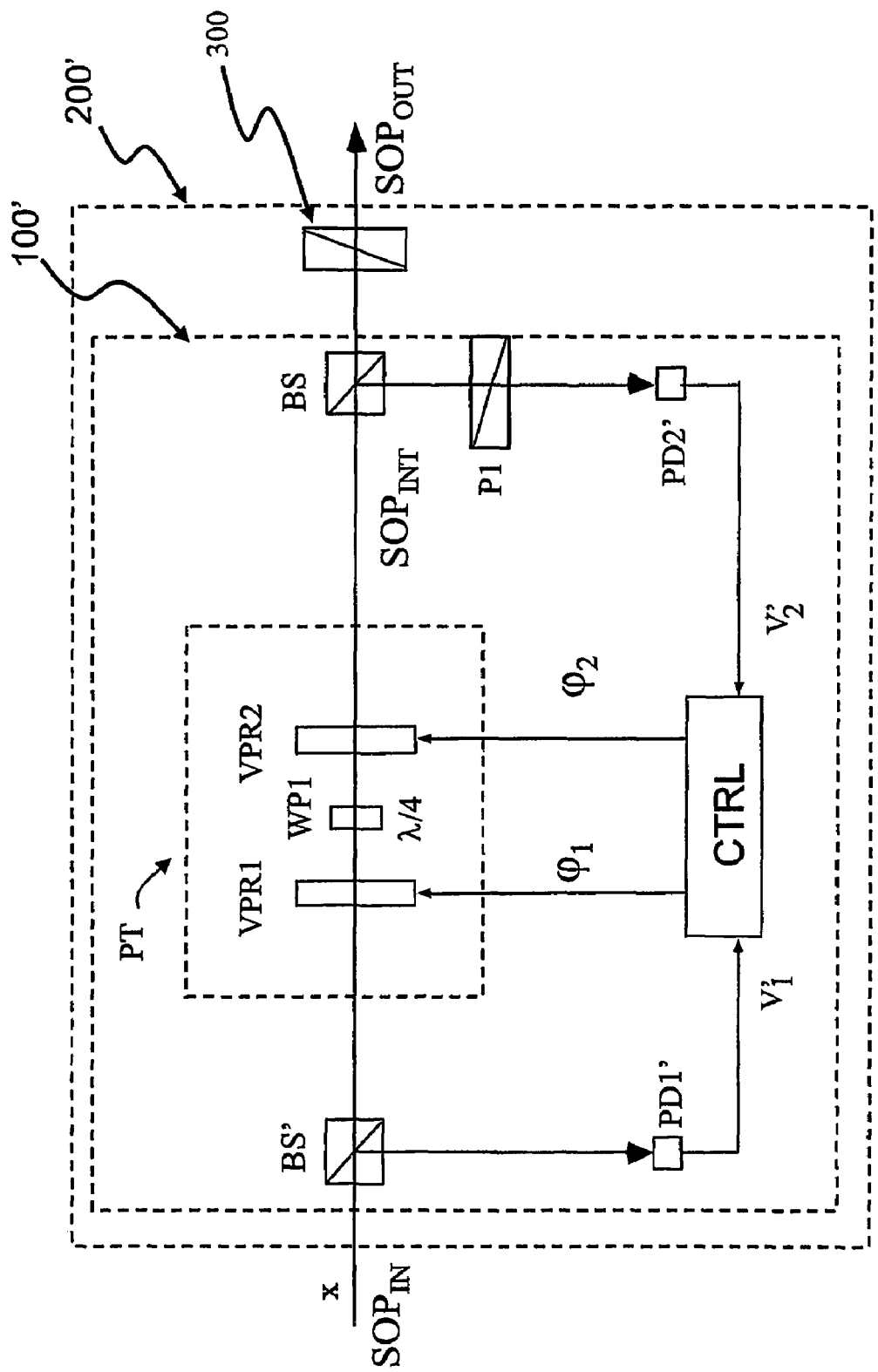
FIG. 1b. Schematic drawing of an endless polarization stabilizer according to an alternative configuration of the present invention.

A possible alternative configuration for the present invention will be now described, with reference to FIG. 1b.

FIG. 1b shows a polarization stabilizer device 100' which essentially differs from the polarization stabilizer device 100 shown in FIG. 1a in the detecting system.

A polarization insensitive beam-splitter BS' (e.g. with a 90/10 split ratio) may be arranged in the beam path x and is apt to extract a small fraction (e.g. 10% in this example, or 1%) of the input optical beam. The extracted fraction of the input optical beam is directed to a photodiode PD1' which is apt to measure the power of the extracted fraction. The beam splitter BS' shown in FIG. 1b is located upstream the polarization transformer PT, but possible variations would be to arrange the polarization insensitive beam splitter BS' along the beam path x either between the polarization transformer PT and the beam splitter BS or downstream the beam splitter BS. Alternatively, the beam splitter BS' can be also located between the beam splitter BS and the polarizer P1.

As shown in FIG. 1b, a fixed linear polarizer P1 is apt to receive the optical radiation extracted by the beam splitter BS. The azimuth of the linear polarizer P1 may be parallel or perpendicular to the defined azimuth. A photodiode PD2' is optically connected to P1 so that it is apt to measure the power of the polarized component transmitted by P1.

The principle of operation of the device 100' is similar to the one described for device 100. As in the case of the device 100, it is provided a detecting system comprising elements (e.g. BS, P1, PD2') having the function of extracting a polarized portion (e.g. orthogonal or parallel to the defined azimuth) of the optical radiation output from the second rotator VPR2 and generating a signal V$_2$' responsive to the optical power of said extracted polarized portion. The detecting system of the device 100' further comprises elements (e.g. BS', PD1') having the function of extracting a portion of the optical radiation along the beam path x and generating a signal V$_1$' responsive to the optical power of said extracted portion and indicative of the optical power propagating along the beam path x.

A controller CTRL generates an error value by comparing the optical power of the extracted polarized portion (V$_2$') with a value which is the expected value for this polarized component when the optical radiation output from the second rotator VPR2 has a polarization azimuth at ±45° with respect to the defined azimuth (i.e. lays in the great circle $\Gamma$). Such expected value is calculated based on the signal V$_1$'. For example, the error value may be defined as $\epsilon=|V'_1-\alpha V'_2|$, wherein $\alpha$ has the same function as in the case of polarizer 100, that is to say serves for the comparison of the extracted polarized portion (V$_2$') with an expected value derived from V'$_1$. This error serves, through a cyclic feedback algorithm similar to the one described above, to control the proper phase retardations $\Phi_1$ and $\Phi_2$ at each control step. The endless principle of the present configuration is the same of the configuration described with reference to FIG. 1a.

It is noted that the use of the Faraday magneto-optic effect in the polarization stabilizer 100 or 100' allows solving the problem of the criticality of the orientation of the applied field and of the optical propagation direction with respect to the internal structure of the material, as described above in relation to electro-optic and acusto-optic effects. In fact, in variable Faraday rotator, the rotation of the polarization azimuth is directly proportional to the component of the variable magnetic field applied along the direction of propagation of the optical radiation. Varying the direction of propagation and/or the direction of the applied magnetic field, the resulting eigenstates (i.e. left and right circularly polarized) do not change.

It will be appreciated that the polarizing device 100 or 100' has been exemplarily described with reference to a transmitted optical radiation having a SOP (SOP$_{INT}$) laying on the great circle $\Gamma$ passing through the points L and Q (see FIG. 2). However, other devices based on this design could provide an output SOP laying on any other great circle (e.g. meridian) on the Poincaré sphere that may be desired.

As shown in FIGS. 1a-b, a polarizing element 300 may be advantageously placed along the optical path x downstream the second variable rotator VPR2 of the polarization stabilizer 100 or 100'. The polarizing element 300 is apt to receive the optical radiation having one of the two polarization parameters stabilized and to transmit the optical radiation having both the polarization parameters stabilized (i.e. having a defined SOP). The polarization stabilizer 200 or 200' comprising the one-parameter polarization stabilizer 100 or 100' and the polarizing element 300 forms a full polarization stabilizer 200 or 200' wherein the optical radiation output from the polarizing element 300 has a defined SOP (labeled SOP$_{OUT}$ in FIG. 1a or 1b) having a defined azimuth and a defined ellipticity. For example, without loss of generality, the defined SOP may be the vertical linear SOP, having vertical azimuth and zero ellipticity.

In a configuration, the polarizing element 300 may be a fixed linear polarizer having its azimuth oriented parallel to the defined output azimuth, for example a vertical linear polarizer. Accordingly, the optical radiation output from the one-parameter stabilizer 100 or 100' having a SOP ($SOP_{INT}$) with azimuth at ±45° with respect to the defined azimuth may be subsequently fully polarized by the fixed vertical linear polarizer 300 along the defined (vertical) azimuth and with the defined (zero) ellipticity. In this case, the stabilized output power transmitted by the output fixed linear polarizer 300 is half of the maximum output power obtainable in open loop by varying the input SOP. Referring to FIGS. 2 and 3, each SOP corresponding to a point belonging to the great circle Γ may be transmitted into the vertical linear SOP (V=$SOP_{OUT}$ in FIGS. 2 and 3) by the fixed linear polarizer 300 with the same power loss of 3 dB. In any instant during the commutation of first rotator VPR1, half of the optical power incident onto the fixed linear polarizer 300 is transmitted, obtaining an endless full polarization stabilization which includes a stabilized output optical power. In order to have an uniformity error in the output power of less then 1%, the step angle may be chosen less than 0.3 degree. It is thus preferred that the step size is less than about 0.5 degrees.

In case a fixed linear polarizer 300 is employed, a possible variation to the configuration of the full stabilizer 200' of FIG. 1b would be to arrange the fixed linear polarizer 300 between the second rotator VPR2 and the polarization insensitive beam splitter BS. In this variant, the additional polarizer P1 of FIG. 1b may be avoided and the second photodiode PD2' would receive from the beam splitter BS a reflected portion of the optical radiation having the defined (vertical-linear) output SOP.

In this context, a further alternative configuration for the full stabilizer 200' of FIG. 1b would be to move the first polarization insensitive beam splitter BS' (optically connected to the photodiode PD1', which in turns remains connected to the controller CTRL) downstream the fixed linear polarizer 300. Accordingly, the photodiode PD1' would receive from the beam splitter BS' a reflected portion of the optical radiation having the defined (vertical) output SOP.

As will be understood from the above, the use of a fixed linear polarizer 300 in the full polarization stabilizers 200 or 200' determines an intrinsic loss of 3 dB. In other words, in perfect lossless operation, the fully polarization stabilized output optical beam can never exceed half the power of the input optical beam.

A preferred embodiment is now described which has no intrinsic loss. In other words, in perfect lossless operation, the polarization stabilized output optical beam can potentially have up to the full power of the input optical beam.

FIG. 4 shows an exemplary polarizing element 300 according to a preferred embodiment of the invention, wherein an active polarizing element 300 is used as the polarizing element 300 of FIGS. 1a, 1b instead of a fixed linear polarizer.

Referring to FIG. 4, the polarizing element 300 comprises a polarization transformer PT' similar in structure to the polarization transformer PT described with reference to FIGS. 1a-b. Accordingly it comprises third and fourth variable rotators VPR3 and VPR4, for example similar to the variable rotators VPR1 and VPR2 of FIGS. 1a-b, and an optically interposed quarter-wave plate WP2. The Applicant has surprisingly found that the orientation of the eigenaxes of the quarter-wave plate WP2 may be arbitrary, similarly to the orientation of the quarter-wave plate WP1 of the first polarization transformer PT. In other words, the eigenaxes of the quarter-wave plate WP2 are oriented at ±45−δ' degrees with respect to the defined azimuth, wherein δ' is a further arbitrary value expressed in degrees. It may be assumed that δ' ranges from −90 degrees to +90 degrees, limits included.

The elements VPR3, WP2 and VPR4 are arranged along the main beam path x of the polarization stabilizer 200, 200' so as to receive the optical beam (whose SOP is labeled $SOP_{INT}$ in FIG. 4) output from the polarization transformer PT of the polarization stabilizer 100 or 100'. The fully stabilized SOP of the optical beam in output from the active polarizing element 300 is labeled $SOP_{OUT}$.

A polarization insensitive beam splitter BS" (e.g. 90/10 or 99/1) is arranged along the main beam path x downstream the fourth rotator VPR4. A fixed linear polarizer P2 is placed at the reflected output of the beam splitter BS" and it is oriented parallel or perpendicular to the defined azimuth. A further fixed linear polarizer P3 is placed along the beam path x and it is oriented parallel to the defined azimuth. The beam transmitted by the polarizer P3 is the linearly polarized output optical beam of the stabilizer 200 or 200'. In case of application of the polarization stabilizer 200 or 200' to PolDM demultiplexing, the further fixed linear polarizer P3 may be replaced by a polarizing beam splitter arranged along the main beam path x and oriented with its azimuth extending parallel or perpendicular to the defined output azimuth. The orthogonally polarization multiplexed channels are separated by this polarizing beam splitter.

The beam splitter BS" and the linear polarizer P2 are apt to extract a polarized portion of the optical beam and direct it to a photodiode PD3, which is apt to measure the power of this extracted polarized portion and generate a signal $V_3$ responsive of the power.

A controller CTRL' is connected to the photodiode PD3 and has first and second outputs connected to the third and fourth rotators VPR3 and VPR4 respectively.

The signal $V_3$ is sent to an input of the electronic controller CTRL' that generates as outputs, responsive to the input signal $V_3$, control signals $\phi_3$ and $\phi_4$ for setting the rotators VPR3 and VPR4 to the appropriate phase retardation values $\Phi_3$ and $\Phi_4$.

The controller CTRL' is operable to ensure that the third variable rotator VPR3 preferably switches between only two retardation values, e.g. 0−2δ' degrees and 180−2δ' degrees, while the fourth variable rotator VPR4 has a retardation stepwise smoothly varying, preferably in the range from 0+2δ' degrees to 180+2δ' degrees.

Preferably, whenever the SOP input to the fourth rotator VPR4 varies to cause the phase retardation $\Phi_4$ of the fourth rotator reaches a threshold of its predefined range equal to n180+2δ' degrees, n integer, then the retardation $\Phi_3$ of the third variable rotator VPR3 is switched by the controller CTRL, through respective control signal $\phi_3$, between a first and a second value. Said first and second values may be chosen from a plurality of values, selectable for the above switch, within the limited range of the third rotator VPR3. Typically, the phase retardation $\Phi_3$ spans all the intermediate values during the switch between a first and a second value. Preferably, two adjacent values within the plurality of switching values are spaced apart by an odd (different from zero) integer multiple of 180°. Preferably, the phase retardation $\phi_3$ may be controlled to switch between only two retardation values which differ by an odd (different from zero) integer multiple of 180°. Preferably, this integer multiple is equal to 1 or −1.

The fact that the one-parameter polarization stabilizer 100 or 100' is controlled independently of the active polarizing element 300 of FIG. 4 is highly advantageous, since the provision of two stages (stage 100, or 100', and stage 300 of FIG. 4) does not lead to any additional complexity to the control, since no time synchronization between the first and second respective controllers CTRL and CTRL' is required.

Separate controllers CTRL and CTRL' are shown for the polarization stabilizer 100 or 100' and the polarizing element 300 of FIG. 4, consistent with their functional independence from one another. However, it will be understood that the two controllers could be embodied in a single hardware, firmware or software unit.

In operation, the elliptical SOP with fixed axes ($SOP_{INT}$), obtained as output of the one-parameter stabilizer 100 or 100', is transformed by the polarizing element 300 of FIG. 4 into a fixed linear SOP having the defined azimuth with optical power independent of the input SOP. The operation of the polarizing element 300 of FIG. 4 is controlled by a feed-back control loop based on the one described above.

The controller CTRL' executes the same control algorithm as the one-parameter stabilizer 100 or 100', the only difference being that in step 9 the current error is now the absolute value of $V_3$. The aim of the feed-back is to minimize or maximize (depending on the azimuth orientation of the fixed polarizer P2) this error. This is equivalent to an SOP output from the polarization transformer PT' equal to the one passed by the polarizer P3, so that the optical power is totally transmitted by P3.

FIGS. 5 and 6a-6c are now referred to to explain the principles of operation of the full polarization stabilizer 200 or 200', including the polarizing element 300 according to FIG. 4, in terms of a Poincaré sphere representation.

For the sake of clarity, the following illustrative description refers to the particular case of the values δ and δ' both equal to zero.

Figure 5:
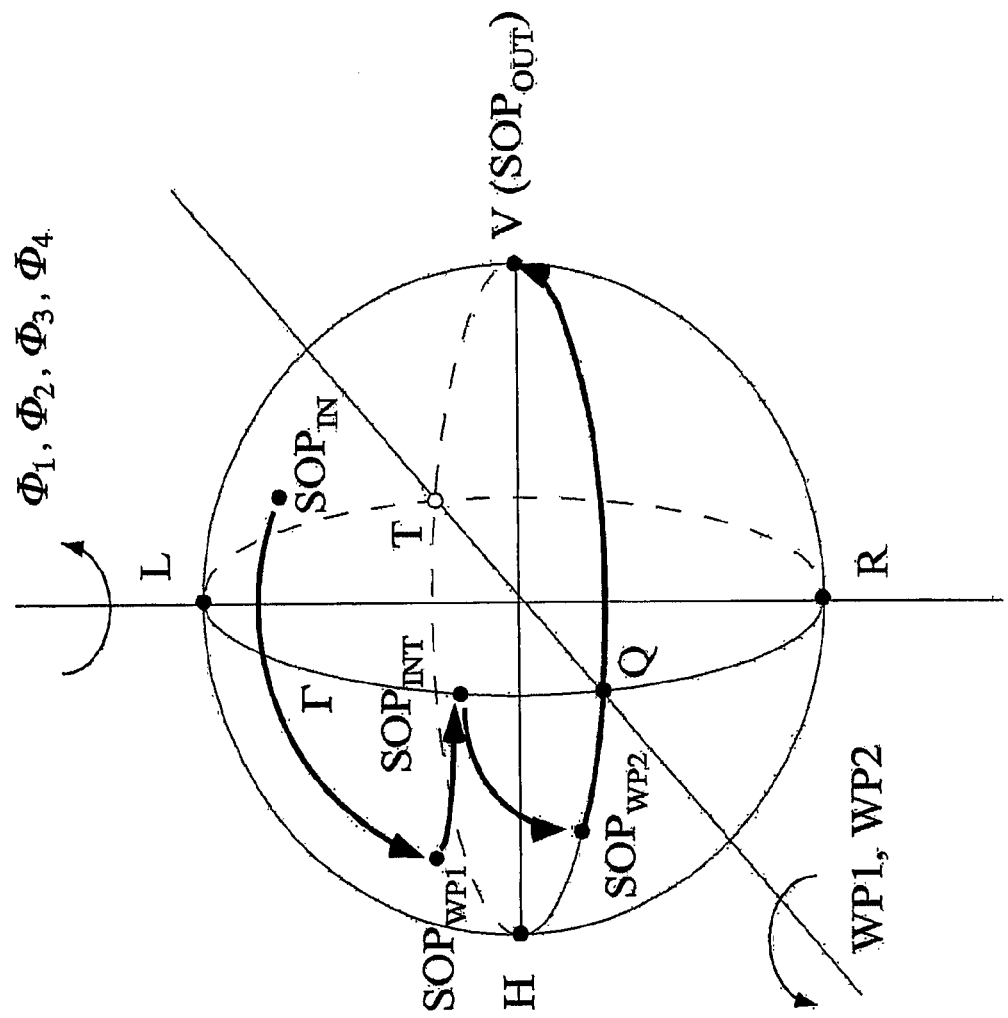
FIG. 5. Poincaré sphere representation of a polarization stabilizer according to an embodiment of the present invention.

In FIG. 5, it is assumed that the first and the third commuted rotators VPR1, VPR3 do not act on the SOP ($\Phi_1=0°$ and $\Phi_3=0°$). First (trajectory $SOP_{IN}$-$SOP_{WP1}$-$SOP_{INT}$), the representative point of the SOP is kept by the feed-back of the one-parameter stabilizer 100 or 100' on the great circle indicated by Γ in FIG. 5. Then the polarizing element 300 of FIG. 4, by controlling the phase retardation $\Phi_4$, moves the SOP, belonging to the great circle Γ, into the output linear SOP with azimuth η=90°, corresponding to the point V (trajectory $SOP_{INT}$-$SOP_{WP2}$-$SOP_{OUT}$).

The endless operation of the control procedure of the active polarizing element 300 of FIG. 4 is now described with reference to FIGS. 6a-6c, under the assumption that the representative point of the incident SOP ($SOP_{INT}$) endlessly moves on the great circle Γ in the direction from point Q to point L.

Figure 6A:
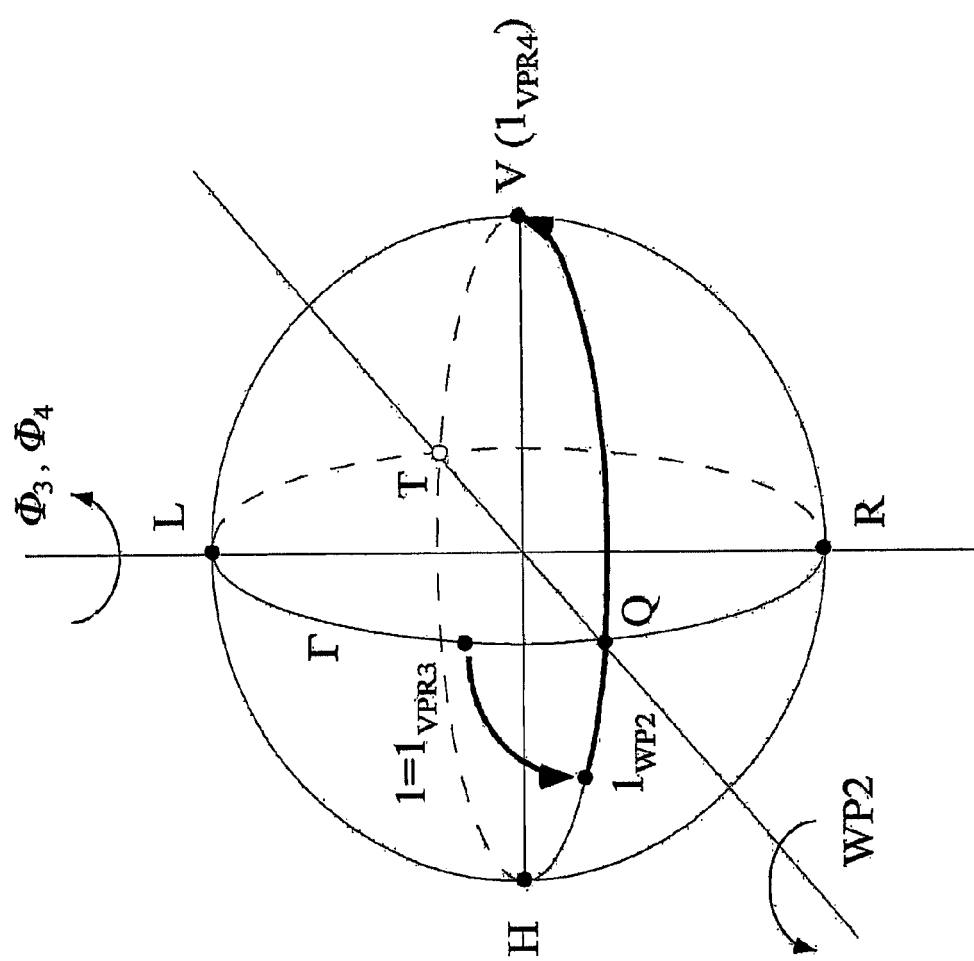
FIG. 6a-6c. SOP transformations on the Poincaré sphere generated by an embodiment of the polarizing element of FIG. 4.
Figure 6B:
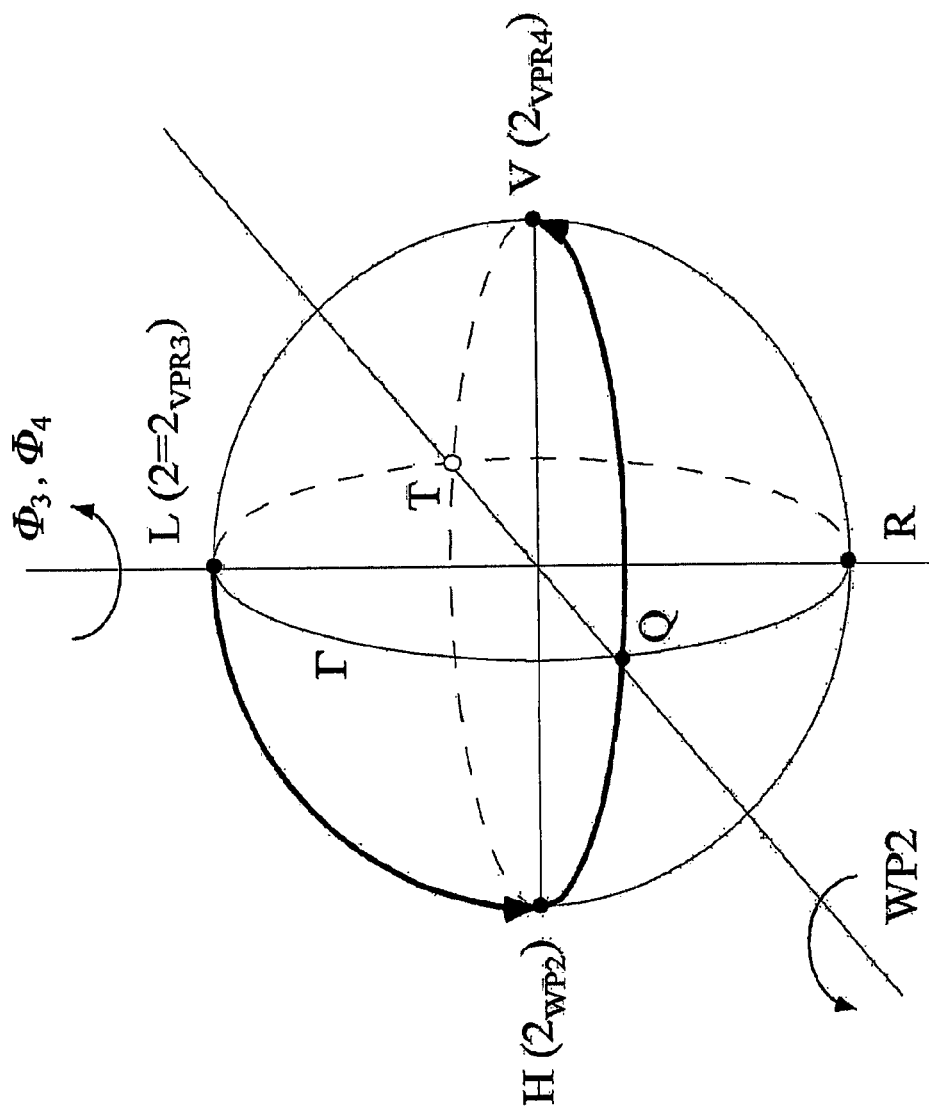
Figure 6C:
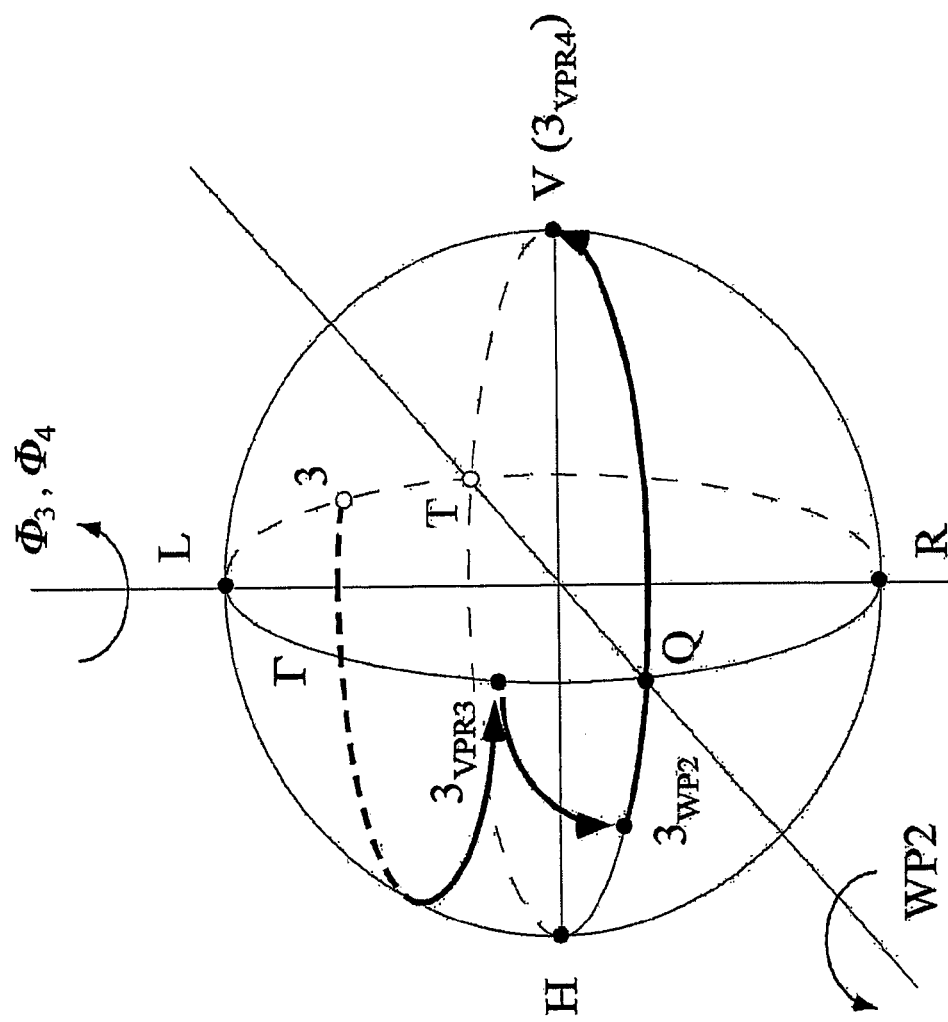

FIGS. 6a-6c represent the corresponding evolution of the SOPs during the propagation through the birefringent elements of the polarizing element 360 of FIG. 4. The points labeled with the subscripts VPR3, WP2 and VPR4 represent respectively the SOP outputted by the switched rotator VPR3, the SOP outputted by the linear plate WP2 and the SOP transmitted by the smoothly varied rotator VPR4. In all cases the output SOP is the linear state represented by the point V. Initially (FIG. 6a) the point 1, representative of the first $SOP_{INT}$, is left unaltered by the third rotator VPR3 (phase retardation of the switched rotator VPR3 $\Phi_3=0°$). Then it is transformed into the point $1_{WP2}$ by the action of the quarter-wave plate WP2 and subsequently into the point $1_{VPR4}$ by the action of the smoothly varied rotator with exemplary phase retardation $\Phi_4=135°$. While the representative point 1 moves along the great circle Γ, the control algorithm reacts by increasing the phase retardation $\Phi_4$ until reaching the value of 180° when the point $SOP_{INT}$ reaches the north pole L, that is to say is left circularly polarized (FIG. 6b, point 2, $\Phi_3=0°$, $\Phi_4=180°$). The further variation of $SOP_{INT}$ can not be compensated simply by further increasing $\Phi_4$ because it has reached the exemplary upper limit of 180°. Therefore, in order to obtain an endless control, the phase retardation $\Phi_3$ is commuted from 0° to 180°, while $\Phi_4$ is kept constant, i.e. equal to 180° (after commutation: $\Phi_3=180°$, $\Phi_4=180°$). As illustrated in FIG. 6b, since the point 2 ($SOP_{INT}$) is an eigenstate (L) of the variable rotator, it is not perturbed during the switching of the rotator VPR3. This assures that the commutation does not perturb the output power, provided that the $SOP_{INT}$ is nearly constant during the commutation. If this condition is fulfilled, then nearly all of the optical power incident on the polarizing element 300 of FIG. 4 is transmitted in any instant during the commutation through the polarizer P3, obtaining an endless polarization stabilization. Now the further variation of $SOP_{INT}$, as illustrated in FIG. 6c, is compensated by decreasing $\Phi_4$ ($\Phi_3=180°$, $\Phi_4=135°$).

In a full polarization stabilizer device 200 or 200' including the polarizing element 300 of FIG. 4, the commutation of VPR1 causes a 180°-rotation on Γ of the SOP ($SOP_{INT}$) output from the device 100 or 100' and this SOP variation has to be compensated by the polarizing element 300 of FIG. 4. In order to effectively stabilize the $SOP_{OUT}$ at the output of device 300 of FIG. 4, the commutation speed of VPR1 has to be dimensioned to the speed of tracking of the polarizing element 300. Said $\vartheta'$ the step angle size of the control algorithm of the polarizing element 300, the $SOP_{INT}$ rotation on the Poincaré sphere generated by the VPR1 commutation must be preferably less than $\vartheta'$ in a step time of the control algorithm of device 300. This condition is equivalent to consider a commutation time of VPR1 which is K times the step time of the polarizing element 300 of FIG. 4, where K is given, for a switch range of the first rotator VPR1 equal to 180°, by $$K > \frac{180°}{\vartheta'}.$$

In particular the Applicant has found that a good trade-off between control speed and tracking stability is a value of $$K = 4 \cdot \frac{180°}{\vartheta'}.$$

It is noted that a possible error by the one-parameter polarization stabilizer 100 or 100' in locking the polarization azimuth on the desired great circle Γ will definitely result in a related non-zero uniformity error of the full polarization stabilizer 200 or 200', even under the assumption of an ideal (no error) polarizing element 300. Moreover, the error in the first step 100 or 100' cannot be recovered by the polarizing element 300, even in the more sophisticated configuration of FIG. 4.

It will be appreciated that the full polarization stabilizer 200 or 200' provides an output optical radiation having a fixed linear SOP. However, other devices based on this design could provide any other defined SOP that may be desired. For example, circularly polarized light, or elliptically polarized light, or linearly polarized light with a time variant rotation of a desired angular velocity. To generate a fixed elliptical output SOP, instead of a linear output SOP, it is sufficient to produce a fixed linear SOP as described above and then obtain an elliptical SOP with a half-wave plate followed by a quarter-wave plate, both fixed and suitably oriented. Another alternative is to add a rotating half-wave plate to transform a fixed linear SOP into a rotating linear SOP.

The full polarization stabilizer 200 or 200' can also be modified to obtain any fixed output linear SOP other than vertical linear SOP (i.e. a change in the defined azimuth) by suitable rotation of the element WP1 (rotation of the eigenaxes azimuth) and the elements PBS and 300, when the latter is a fixed linear polarizer. In case the polarizer 300 is in the configuration of FIG. 4, similar considerations still hold for the elements WP2, P2 and P3. This generalized configuration is obtained from the configuration represented in FIG. 2 by a suitable rotation of the Poincaré sphere about the vertical (L-R) axis.

More in general, any rigid rotation of the Poincaré sphere shown in FIG. 2 results in a respective configuration of the polarizers shown in FIGS. 1a and 1b which is contemplated by the present invention.

The invention claimed is:

1. A polarization stabilizing device for stabilizing the state of polarization of optical radiation, comprising:
   1) a polarization transformer comprising:
      A) a first and a second variable polarization rotator operable to provide respective first and second variable phase retardations to the optical radiation; and
      B) a quarter-wave plate optically interposed between the first and the second variable polarization rotator and having eigenaxes oriented at respectively $+45-\delta$ degrees and $-45-\delta$ degrees to a defined azimuth, wherein $\delta$ is an arbitrary value expressed in degrees;
   2) a detecting system capable of generating a monitor signal representative of an optical power of a polarized portion of the optical radiation output from the second variable polarization rotator; and
   3) a controller capable of receiving said monitor signal from the detecting system and supplying first and second control signals responsive to said monitor signal, respectively, to the first and second variable polarization rotators so as to control said first and second variable phase retardations, wherein the controller is configured:
   to set the second control signal so as to maintain the polarization azimuth of the optical radiation output from the second variable polarization rotator at a value of about +45 degrees or −45 degrees to said defined azimuth; and,
   in case the second variable phase retardation reaches a predefined threshold value equal to about $k180+2\delta$ degrees, wherein k is an integer and $\delta$ is said arbitrary value expressed in degrees, to set the first control signal so as to switch the first variable phase retardation between first and second values.

2. The polarization stabilizing device according to claim 1, wherein the controller is further configured to generate an error value responsive to said monitor signal and related to a displacement of the polarization azimuth of the optical radiation output from the second variable polarization rotator from a value of about +45 degrees or −45 degrees to said defined azimuth, and to set the first and second control signals responsive to the error value.

3. The polarization stabilizing device according to claim 1, wherein the controller is configured to set the second control signal to stepwise vary the second variable phase retardation in a range of variation of at least 180 degrees, wherein said predefined threshold value is an upper or lower limit of said range of variation.

4. The polarization stabilizing device according to claim 3, wherein said range of variation spans from $k180+2\delta$ degrees to $(k+k')180+2\delta$ degrees, wherein k' is an integer different from zero.

5. The polarization stabilizing device according to claim 4, wherein k' is equal to 1 or −1.

6. The polarization stabilizing device according to claim 1, wherein said first and second values of the first variable phase retardation are spaced apart by an odd integer multiple of 180 degrees.

7. The polarization stabilizing device according to claim 6, wherein said odd integer multiple is equal to 1 or −1.

8. The polarization stabilizing device according to claim 1, wherein the detecting system is further capable of generating a further monitor signal responsive of an optical power of a further polarized portion of the optical radiation and of supplying the further monitor signal to the controller.

9. The polarization stabilizing device according to claim 1, further comprising a polarizing element capable of polarizing the optical radiation output from the second variable polarization rotator to a defined state of polarization having said defined azimuth.

10. The polarization stabilizing device according to claim 9, wherein the polarizing element is a fixed linear polarizer.

11. The polarization stabilizing device according to claim 9, wherein the polarizing element comprises:
   1) a further polarization transformer comprising:
      A) a third and a fourth variable polarization rotator operable to provide respective third and fourth variable phase retardations to the optical radiation; and
      B) a further quarter-wave plate optically interposed between the third and the fourth variable polarization rotator and having eigenaxes oriented at respectively $+45-\delta'$ degrees and $-45-\delta'$ degrees to said defined azimuth, wherein $\delta'$ is a further arbitrary value expressed in degrees;
   2) a further detecting system capable of generating a polarizing element monitor signal representative of an optical power of a polarized portion of the optical radiation output from the fourth variable polarization rotator; and
   3) a further controller connected to receive said polarizing element monitor signal from the further detecting system and to supply third and fourth control signals responsive to said polarizing element monitor signal, respectively, to the third and fourth variable polarization rotators so as to control said third and fourth variable phase retardations, wherein the further controller is configured to set the fourth control signal so as to maintain the state of polarization of the optical radiation output from the fourth variable rotator at said defined state of polarization.

12. The polarization stabilizing device according to claim 11, wherein the further controller is configured to set, in case the fourth variable phase retardation reaches a further predefined threshold value, the third control signal so as to switch the third variable phase retardation between third and fourth values equal respectively to about $n'180-2\delta'$ degrees and $(n'+n'')180-2\delta'$ degrees, wherein n' is an integer, n'' is an odd integer and $\delta'$ is said further arbitrary value expressed in degrees.

13. The polarization stabilizing device according to claim 12, wherein said further predefined threshold value is equal to about $n180+2\delta'$ degrees, wherein n is an integer.

14. The polarization stabilizing device according to claims 11, wherein the values of $\delta$ and $\delta'$ are both equal to about zero degrees.

15. An optical polarization demultiplexer comprising the polarization stabilizing device of claim 11, wherein the polarizing element further comprises a polarization beam splitter located, with respect to a direction of propagation of the optical radiation input into the first variable polarization rotator, downstream the fourth variable polarization rotator and having azimuth parallel or perpendicular to said defined azimuth.

16. A polarization division multiplexing system comprising a polarization multiplexer capable of combining a first and a second optical signal having orthogonal polarization, a transmission line capable of receiving said combined first and second optical signal and an optical polarization demultiplexer according to claim 15, coupled to said transmission line, and capable of separating said first and second optical signals.

17. The polarization stabilizing device according to claim 1, wherein the value of δ is equal to about zero degrees.

18. A method of stabilizing the state of polarization of optical radiation, comprising:
   1) passing the input optical radiation sequentially through a first variable polarization rotator giving a first controllable phase retardation; a quarter-wave plate having eigenaxes oriented at respectively +45-δ degrees and −45-δ degrees to a defined azimuth, wherein δ is an arbitrary value expressed in degrees; and a second variable polarization rotator giving a second controllable phase retardation;
   2) extracting a polarized portion of the optical radiation output from the second variable polarization rotator;
   3) controlling, responsive to the optical power of said polarized portion, the second controllable phase retardation so that the optical radiation output from the second variable polarization rotator has a polarization azimuth which is about +45 degrees or −45 degrees to said defined azimuth; and
   4) in case the second controllable phase retardation reaches a predefined threshold value equal to about k180+2δ degrees, wherein k is an integer and δ is said arbitrary value expressed in degrees, switching the first controllable phase retardation between first and second values.

19. The method according to claim 18, wherein said first and second values of the first variable phase retardation are spaced apart by an odd integer multiple of 180 degrees.

20. The method according to claim 18, further comprising:
   1) passing sequentially the optical radiation output from the second variable polarization rotator through a third variable polarization rotator giving a third controllable phase retardation; a further quarter-wave plate having eigenaxes oriented at respectively +45-δ' degrees and −45-δ' degrees to said defined azimuth, wherein δ' is a further arbitrary value expressed in degrees; and a fourth variable polarization rotator giving a fourth controllable phase retardation;
   2) extracting a further polarized portion of the optical radiation output from the fourth variable polarization rotator;
   3) controlling, responsive to the optical power of said further polarized portion, the fourth controllable phase retardation so that the optical radiation output from the fourth variable polarization rotator has said defined azimuth and a defined ellipticity; and
   4) in case the fourth controllable phase retardation reaches a further predefined threshold value, switching the third controllable phase retardation between third and fourth values.

21. The method according to claim 20, wherein said third and fourth values of the third variable phase retardation are equal respectively to about n'180-2δ' degrees and (n'+n")180-2δ' degrees, wherein n' is an integer, n" is an odd integer and δ' is said further arbitrary value expressed in degrees.

* * * * *